United States Patent
Liu

(10) Patent No.: US 12,479,482 B2
(45) Date of Patent: Nov. 25, 2025

(54) SYSTEMS AND METHODS FOR MACHINE LEARNING ENHANCED RAILWAY CONDITION MONITORING, ASSESSMENT AND PREDICTION

(71) Applicant: Rutgers, The State University of New Jersey, New Brunswick, NJ (US)

(72) Inventor: Xiang Liu, New Brunswick, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 92 days.

(21) Appl. No.: 18/511,330

(22) Filed: Nov. 16, 2023

(65) Prior Publication Data

US 2024/0083478 A1   Mar. 14, 2024

Related U.S. Application Data

(63) Continuation of application No. PCT/US2022/029823, filed on May 18, 2022.

(Continued)

(51) Int. Cl.
*B61L 23/04* (2006.01)
*B61L 25/02* (2006.01)
(Continued)

(52) U.S. Cl.
CPC ........... *B61L 23/041* (2013.01); *B61L 23/042* (2013.01); *B61L 25/025* (2013.01); *B61L 25/026* (2013.01);
(Continued)

(58) Field of Classification Search
CPC .... B61L 23/041; B61L 23/042; B61L 25/025; B61L 25/026; G06T 7/0002; G06T 7/579;
(Continued)

(56) References Cited

U.S. PATENT DOCUMENTS

| 12,079,721 B2 * | 9/2024 | Dolberg ............... G06F 18/214 |
| 2014/0200827 A1 | 7/2014 | Bhattacharjya et al. |

(Continued)

FOREIGN PATENT DOCUMENTS

| CA | 3149744 A1 * | 3/2021 | .............. B61K 9/08 |
| CN | 112014593 B * | 5/2022 | ............. G01D 21/00 |
| WO | 202012475 A1 | 1/2020 | |

OTHER PUBLICATIONS

Jang et al, "Intelligent Image-Based Railway Inspection System Using Deep Learning-Based Object Detection and Weber Contrast-Based Image Comparison", MPDI, Oct. 31, 2019, 17 pages, Switzerland.

*Primary Examiner* — Hai H Huynh
(74) *Attorney, Agent, or Firm* — Greenberg Traurig, LLP

(57) ABSTRACT

Systems and methods enable automated intelligent railway monitoring using railway image data from an imaging device. The railway image data includes image frames produced by the imaging device. A railway object recognition model is used to identify objects within the image frames and a railway condition is determined based on the object. A location and time associated with the railway condition are determined based on railway image data. Railway metrics are generated based on the railway condition and historical railway conditions. A railway condition prediction model is used to predict future railway conditions affecting an operating condition, an operating demand or both based on the railway metrics. An operating recommendation is determined to address the future railway condition and an alert is generated to with an indication of railway condition, the operating recommendation or both.

38 Claims, 24 Drawing Sheets

Related U.S. Application Data

(60) Provisional application No. 63/190,490, filed on May 19, 2021.

(51) Int. Cl.
*G06T 7/00* (2017.01)
*G06T 7/579* (2017.01)
*G06V 10/82* (2022.01)
*G06V 20/58* (2022.01)
*G06V 40/10* (2022.01)

(52) U.S. Cl.
CPC ............ *G06T 7/0002* (2013.01); *G06T 7/579* (2017.01); *G06V 10/82* (2022.01); *G06V 20/58* (2022.01); *G06V 40/10* (2022.01); *G06T 2207/20081* (2013.01); *G06T 2207/20084* (2013.01); *G06T 2207/30184* (2013.01); *G06T 2207/30196* (2013.01); *G06T 2207/30242* (2013.01); *G06T 2207/30261* (2013.01)

(58) Field of Classification Search
CPC . G06T 2207/20081; G06T 2207/20084; G06T 2207/30184; G06T 2207/30196; G06T 2207/30242; G06T 2207/30261; G06V 10/82; G06V 20/58; G06V 20/56; G06V 20/52; G06V 40/10
USPC .................................................... 701/19, 20
See application file for complete search history.

(56) References Cited

U.S. PATENT DOCUMENTS

| | | |
|---|---|---|
| 2015/0009331 A1 | 1/2015 | Venkatraman |
| 2021/0078619 A1 | 3/2021 | Morita et al. |
| 2021/0122402 A1 | 4/2021 | Bohm et al. |
| 2021/0279488 A1* | 9/2021 | Dolberg .................. G06N 3/08 |

\* cited by examiner

| Time of Day | Monday | Tuesday | Wednesday | Thursday | Friday | Saturday | Sunday |
|---|---|---|---|---|---|---|---|
| 0:00 | 7 | 0 | 4 | 8 | 8 | 8 | 1 |
| 1:00 | 4 | 5 | 8 | 0 | 5 | 1 | 9 |
| 2:00 | 7 | 7 | 7 | 9 | 10 | 3 | 7 |
| 3:00 | 1 | 6 | 7 | 7 | 0 | 4 | 5 |
| 4:00 | 3 | 7 | 9 | 8 | 4 | 1 | 6 |
| 5:00 | 6 | 3 | 6 | 5 | 7 | 8 | 10 |
| 6:00 | 10 | 2 | 9 | 4 | 0 | 6 | 4 |
| 7:00 | 5 | 2 | 9 | 5 | 2 | 9 | 7 |
| 8:00 | 2 | 17 | 22 | 28 | 13 | 10 | 15 |
| 9:00 | 1 | 6 | 27 | 0 | 28 | 10 | 7 |
| 10:00 | 7 | 22 | 1 | 29 | 19 | 24 | 23 |
| 11:00 | 20 | 9 | 2 | 23 | 1 | 28 | 20 |
| 12:00 | 25 | 10 | 7 | 16 | 22 | 7 | 10 |
| 13:00 | 15 | 18 | 26 | 5 | 1 | 16 | 4 |
| 14:00 | 1 | 8 | 13 | 30 | 12 | 0 | 26 |
| 15:00 | 16 | 5 | 27 | 19 | 16 | 11 | 23 |
| 16:00 | 17 | 16 | 14 | 19 | 5 | 18 | 1 |
| 17:00 | 3 | 26 | 30 | 8 | 28 | 27 | 1 |
| 18:00 | 20 | 19 | 21 | 14 | 5 | 21 | 30 |
| 19:00 | 7 | 8 | 9 | 1 | 5 | 9 | 4 |
| 20:00 | 7 | 4 | 7 | 1 | 3 | 5 | 5 |
| 21:00 | 7 | 6 | 6 | 2 | 3 | 8 | 5 |
| 22:00 | 5 | 7 | 1 | 10 | 8 | 1 | 4 |
| 23:00 | 3 | 5 | 8 | 0 | 4 | 4 | 2 |

FIG. 13

| Class | Monday | Tuesday | Wednesday | Thursday | Friday | Saturday | Sunday |
|---|---|---|---|---|---|---|---|
| Car | 31 | 21 | 77 | 30 | 67 | 66 | 55 |
| Truck | 22 | 31 | 40 | 20 | 23 | 28 | 19 |
| Bus | 3 | 0 | 7 | 0 | 2 | 1 | 0 |
| Motorcycle | 0 | 10 | 4 | 1 | 1 | 2 | 1 |
| Bicycle | 4 | 0 | 3 | 3 | 7 | 2 | 1 |
| Person | 12 | 39 | 14 | 27 | 24 | 15 | 48 |

FIG. 14

SYSTEMS AND METHODS FOR MACHINE LEARNING ENHANCED RAILWAY CONDITION MONITORING, ASSESSMENT AND PREDICTION

This application is a Continuation Application relating to and claiming the benefit of commonly-owned, PCT International Application No. PCT/US2022/029823, filed May 18, 2022, which claims priority to and the benefit of commonly-owned U.S. Provisional Application 63/190,490, filed on May 19, 2021, which is incorporated by reference herein in its entirety.

STATEMENT REGARDING FEDERALLY SPONSORED RESEARCH OR DEVELOPMENT

This invention was made with government support under 693116-20-C-000009 awarded by the Department of Transportation. The government has certain rights in the invention.

FIELD OF TECHNOLOGY

The present disclosure generally relates to computer-based systems and platforms for machine learning enhanced railway condition monitoring, assessment and prediction, including predictive railway condition analysis.

BACKGROUND

This invention is centered at improvement of transportation safety, operational efficiency, resiliency and sustainability. The government and industry has put hundreds of millions of dollars each year to prevent trespassing-related casualties. Additionally, the traffic delays in grade crossings cause millions of dollars each year to address. But the current practice is reactive and based on empirical data or limited historical accident data. Despite the increasing popularity of cameras, analyzing these video data using artificial intelligent solutions has not been well in place to solve this problem. This may be due to the large computation resources required to analyze large volumes of data using machine learning techniques.

SUMMARY

In some aspects, the techniques described herein relate to a method including: receiving, by at least one processor, at least one railway image data feed from at least one imaging device; wherein the at least one railway image data feed includes a plurality of image frames of at least one railway location; utilizing, by the at least one processor, at least one railway object recognition model to identify within at least one image frame of the plurality of image frames at least one object; determining, by the at least one processor, at least one railway condition based at least in part on the at least one object; determining, by the at least one processor, the at least one location and at least one time associated with the at least one railway condition based on at least one imaging device location associated with the at least one imaging device; generating, by the at least one processor, railway metrics based at least in part on the at least one railway condition and at least one historical railway condition; utilizing, by the at least one processor, a railway condition prediction model to predict at least one future railway condition affecting at least one of at least one operating condition or at least one operating demand based at least in part on the railway metrics; determining, by the at least one processor, at least one operating recommendation to address that least one future railway condition; and generating, by the at least one processor, at least one alert to at least one computing device associated with at least one user, wherein the at least one alert includes an indication of at least one of the at least one railway condition or the at least one operating recommendation.

In some aspects, the techniques described herein relate to a method, further including: receiving, by the at least one processor, the at least one railway image data feed including at least one forward-facing image (or rear-facing image) feed from the at least one imaging device positioned on at least one train; wherein the at least one imaging device faces a direction of travel of the at least one train; utilizing, by the at least one processor, the at least one railway object recognition model to identify within the at least one image frame of the plurality of image frames the at least one object and at least one track area; wherein the at least one railway condition recognition model includes a neural network trained on a training dataset of annotated images to automatically annotate images; and determining, by the at least one processor, at least one track area in the at least one image frame of the plurality of image frames based at least in part on at least one rail.

In some aspects, the techniques described herein relate to a method, further including: determining, by the at least one processor, an obstruction railway condition based at least in part on the at least one object being within the at least one track area; and determining, by the at least one processor, a distance from the at least one train to the at least one object based at least in part on a two-frame motion estimation including: mapping an optical flow to a relative distance from the at least one train to the at least one object; and converting the relative distance to an absolute distance based at least in part on a curve fit or alternative methods In some aspects, the techniques described herein relate to a method, further including determining, by the at least one processor, an obstruction railway condition location associated with the obstruction railway condition based at least in part on the at least one railway location and the distance from the at least one train.

In some aspects, the techniques described herein relate to a method, further including generating, by the at least one processor, at least one obstruction metric based at least in part on the obstruction railway condition location and the at least one object.

In some aspects, the techniques described herein relate to a method, further including generating, by the at least one processor, the at least one alert to at least one computing device associated with the at least one train to alert at least one train operator of the obstruction railway condition.

In some aspects, the techniques described herein relate to a method, wherein the at least one obstruction railway conditions includes at least one of: at least one obstacle in the at least one track area, at least one person in the at least one track area, or at least on infrastructure defect in the at least on track area.

In some aspects, the techniques described herein relate to a method, further including: utilizing, by the at least one processor based on the at least one object being a train platform, at least one inferencing algorithm to recognize each passenger on the train platform; and determining, by the at least one processor, a passenger count on the train platform indicative of an amount of passengers based at least in part on each passenger recognized on the train platform.

In some aspects, the techniques described herein relate to a method, further including generating, by the at least one processor, at least one passenger metric based at least in part on the passenger count, the train platform and the at least one railway location.

In some aspects, the techniques described herein relate to a method, further including: determining, by the at least one processor, a defect railway condition based at least in part on the at least one object being a track defect on the at least one rail or in the at least one track area; and determining, by the at least one processor, a distance from the at least one train to the at least one object based at least in part on a two-frame motion estimation using a speed of the at least one train and change in at least one frame location of the at least one object between two consecutive image frames of the at least one image frame.

In some aspects, the techniques described herein relate to a method, further including determining, by the at least one processor, a defect railway condition location associated with the defect railway condition based at least in part on the at least one railway location and the distance from the at least one train.

In some aspects, the techniques described herein relate to a method, further including generating, by the at least one processor, at least one defect metric based at least in part on the defect railway condition location and the defect railway condition.

In some aspects, the techniques described herein relate to a method, wherein the defect railway condition includes at least one of: at least one infrastructure defect, at least one tunnel defect, at least one railroad grade crossing defect, or at least one overhead/trackside device defect.

In some aspects, the techniques described herein relate to a method, further including: receiving, by the at least one processor, the at least one railway image data feed including at least one fixed location image data feed from the at least one imaging device positioned on in at least one fixed location facing at least one railway grade crossing; utilizing, by the at least one processor, the at least one railway object recognition model to identify within the at least one image frame of the plurality of image frames the at least one object; and wherein the at least one railway condition recognition model includes a first neural network trained on a first training dataset of annotated images to automatically annotate images to detect the at least one object; utilizing, by the at least one processor, a second neural network trained on a second training dataset of annotated images to automatically annotate the plurality of images to detect at least one signal status or gate position; and wherein the at least one signal status includes an off status or a flashing status.

In some aspects, the techniques described herein relate to a method, further including determining, by the at least one processor, an obstruction railway condition based at least in part on the at least one object being within the at least one grade crossing area.

In some aspects, the techniques described herein relate to a method, further including generating in response to the grade crossing blockage condition, by the at least one processor, at least one obstruction metric based at least in part on the at least one railway location and the at least one object; and wherein the at least one railway location includes at least one geospatial location associated with the at least one fixed location.

In some aspects, the techniques described herein relate to a method, further including generating in response to the grade crossing blockage condition, by the at least one processor, at least one trespass metric based at least in part on the at least one railway location, the at least one signal light state being at least one red light state and the at least one object; and wherein the at least one railway location includes at least one geospatial location associated with the at least one fixed location.

In some aspects, the techniques described herein relate to a method, wherein the at least one obstruction railway conditions includes at least one of: at least one obstacle in the at least one grade crossing area, at least one person in the at least one grade crossing area, or at least one vehicle in the at least one grade crossing area.

In some aspects, the techniques described herein relate to a method, further including determining, by the at least one processor, a grade crossing blockage time based at least in part on a time between changes of the at least one signal status.

In some aspects, the techniques described herein relate to a system including: at least one processor configured to execute instructions to perform steps to: receive at least one railway image data feed from at least one imaging device; wherein the at least one railway image data feed includes a plurality of image frames of at least one railway location; utilize at least one railway object recognition model to identify within at least one image frame of the plurality of image frames at least one object; determine at least one railway condition based at least in part on the at least one object; determine at least one location and at least one time associated with the at least one railway condition based on at least one imaging device location associated with the at least one imaging device; generate railway metrics based at least in part on the at least one railway condition and at least one historical railway condition; utilize a railway condition prediction model to predict at least one future railway condition affecting at least one of at least one operating condition or at least one operating demand based at least in part on the railway metrics; determine at least one operating recommendation to address that least one future railway condition; and generate at least one alert to at least one computing device associated with at least one user, wherein the at least one alert includes an indication of at least one of the at least one railway condition or the at least one operating recommendation.

In some aspects, the techniques described herein relate to a system, wherein the at least one processor is further configured to execute instructions to perform steps to: receive at least one railway image data feed including at least one forward-facing image or rear-facing image data feed from the at least one imaging device positioned on at least one train; wherein the at least one imaging device faces a direction of travel of the at least one train; utilize at least one railway object recognition model to identify within the at least one image frame of the plurality of image frames the at least one object and at least one track area; wherein the at least one railway condition recognition model includes a neural network trained on a training dataset of annotated images to automatically annotate images; and determine at least one track area in the at least one image frame of the plurality of image frames based at least in part on at least one rail.

In some aspects, the techniques described herein relate to a system, wherein the at least one processor is further configured to execute instructions to perform steps to: determine an obstruction railway condition based at least in part on the at least one object being within the at least one track area; and determine a distance from the at least one train to the at least one object based at least in part on a two-frame motion estimation using a speed of the at least one train and change in at least one frame location of the at least one object between two consecutive image frames of the at least one image frame.

In some aspects, the techniques described herein relate to a system, wherein the at least one processor is further configured to execute instructions to perform steps to determine an obstruction railway condition location associated with the obstruction railway condition based at least in part on the at least one railway location and the distance from the at least one train.

In some aspects, the techniques described herein relate to a system, wherein the at least one processor is further configured to execute instructions to perform steps to generate at least one obstruction metric based at least in part on the obstruction railway condition location and the at least one object.

In some aspects, the techniques described herein relate to a system, wherein the at least one processor is further configured to execute instructions to perform steps to generate the at least one alert to at least one computing device associated with the at least one train to alert at least one train operator of the obstruction railway condition.

In some aspects, the techniques described herein relate to a system, wherein the at least one obstruction railway conditions includes at least one of: at least one obstacle in the at least one track area, at least one person in the at least one track area, or at least on infrastructure defect in the at least on track area.

In some aspects, the techniques described herein relate to a system, wherein the at least one processor is further configured to execute instructions to perform steps to: utilize, based on the at least one object being a train platform, at least one inferencing algorithm to recognize each passenger on the train platform; and determine a passenger count on the train platform indicative of an amount of passengers based at least in part on each passenger recognized on the train platform.

In some aspects, the techniques described herein relate to a system, wherein the at least one processor is further configured to execute instructions to perform steps to generate at least one passenger metric based at least in part on the passenger count, the train platform and the at least one railway location.

In some aspects, the techniques described herein relate to a system, wherein the at least one processor is further configured to execute instructions to perform steps to: determine a defect railway condition based at least in part on the at least one object being a track defect on the at least one track area; and determine a distance from the at least one train to the at least one object based at least in part on a two-frame motion estimation including: mapping an optical flow to a relative distance from the at least one train to the at least one object; and converting the relative distance to an absolute distance based at least in part on a curve fit or alternative methods.

In some aspects, the techniques described herein relate to a system, wherein the at least one processor is further configured to execute instructions to perform steps to determine a defect railway condition location associated with the defect railway condition based at least in part on the at least one railway location and the distance from the at least one train.

In some aspects, the techniques described herein relate to a system, wherein the at least one processor is further configured to execute instructions to perform steps to generate at least one defect metric based at least in part on the defect railway condition location and the defect railway condition.

In some aspects, the techniques described herein relate to a system, wherein the defect railway condition includes at least one of: at least one infrastructure defect, at least one tunnel defect, at least one railroad grade crossing defect, or at least one overhead/trackside device defect.

In some aspects, the techniques described herein relate to a system, wherein the at least one processor is further configured to execute instructions to perform steps to: receive the at least one railway image data feed including at least one fixed location image data feed from the at least one imaging device positioned on in at least one fixed location facing at least one railway grade crossing; utilize the at least one railway object recognition model to identify within the at least one image frame of the plurality of image frames the at least one object; and wherein the at least one railway condition recognition model includes a first neural network trained on a first training dataset of annotated images to automatically annotate images to detect the at least one object; utilize a second neural network trained on a second training dataset of annotated images to automatically annotate the plurality of images to detect at least one signal light state; and wherein the at least one signal status includes an off status or a flashing status.

In some aspects, the techniques described herein relate to a system, wherein the at least one processor is further configured to execute instructions to perform steps to determine an obstruction railway condition based at least in part on the at least one object being within the at least one grade crossing area.

In some aspects, the techniques described herein relate to a system, wherein the at least one processor is further configured to execute instructions to perform steps to generate in response to the grade crossing blockage condition, by the at least one processor, at least one obstruction metric based at least in part on the at least one railway location and the at least one object; and wherein the at least one railway location includes at least one geospatial location associated with the at least one fixed location.

In some aspects, the techniques described herein relate to a system, wherein the at least one processor is further configured to execute instructions to perform steps to generate in response to the grade crossing blockage condition, by the at least one processor, at least one trespass metric based at least in part on the at least one railway location, the at least one signal light state being at least one red light state and the at least one object; and wherein the at least one railway location includes at least one geospatial location associated with the at least one fixed location.

In some aspects, the techniques described herein relate to a system, wherein the at least one obstruction railway conditions includes at least one of: at least one obstacle in the at least one grade crossing area, at least one person in the at least one grade crossing area, or at least one vehicle in the at least one grade crossing area.

In some aspects, the techniques described herein relate to a system, wherein the at least one processor is further configured to execute instructions to perform steps to determine a grade crossing blockage time based at least in part on a time between changes of the at least one signal status.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 13 depicts an example of a heatmap of days of the week and hours of the day highlighting the days that have the highest observed trespasses from the fixed grade crossing imaging pipeline in accordance with one or more embodiments of the present disclosure.

FIG. 14 depicts an example of a heatmap of days of the week and trespasser classification highlighting the days that have the highest observed trespasses from the fixed grade crossing imaging pipeline in accordance with one or more embodiments of the present disclosure.

DETAILED DESCRIPTION

Figure 1:
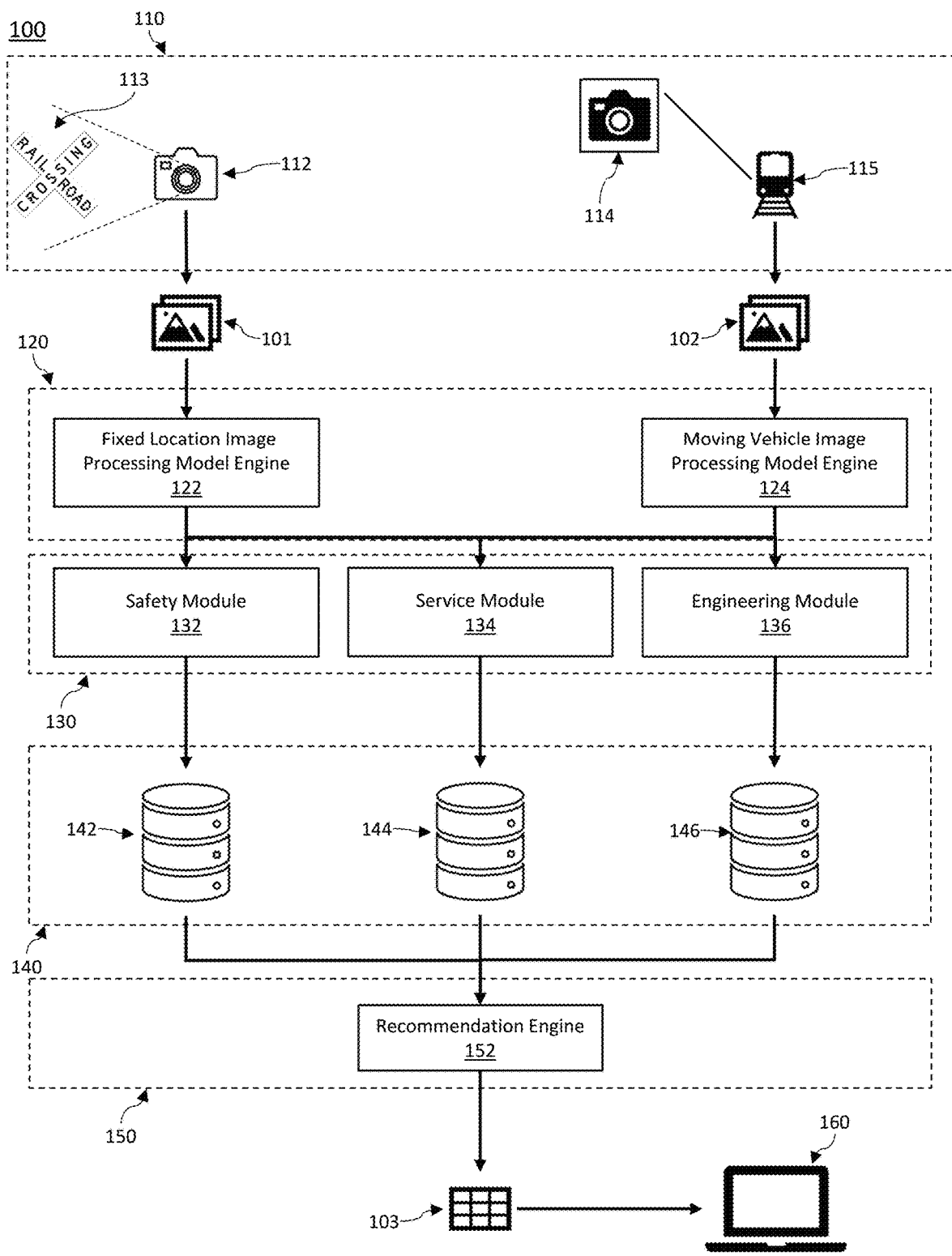
FIG. 1 depicts an illustrative intelligent railway analytics platform for predictive monitoring and assessment of railway conditions in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Compared to alternative detection technologies (including manual review of video), the systems and platform of the present disclosure can leverage strategically placed image sensing devices (e.g., cameras, charge couple devices (CCD), light detection and ranging (LIDAR) sensors, infrared image sensors, ultraviolet image sensors, among other image-based sensing systems or any combination thereof, etc.) with machine learning techniques to reduce the cost of grade crossing delays and accidents, while offering a greater accuracy and flexibility. Similarly, such image sensing devices and machine learning techniques may also be employed for continuous and real-time monitoring of on-track delays, obstructions, accidents and other issues from the trains themselves.

A simple and general market analysis (focusing on the United States) is as follows. This technology can be installed at any grade crossing (with power supply) within a few hours. The US has over one hundred thousand active grade crossings (with power). If even one percent of the locations have this technology, one thousand active grade crossings could benefit from intelligent and predictive monitoring and assessment. The above analysis is only for grade crossings. The technology may be adapted for installation in additional locations, such as right-of-ways, stations, overpasses, tunnels, etc.

This technology can be used by a larger number of infrastructure owners (including but not limited to departments of transportation, railroads, transit agencies etc.) to automatically monitor grade crossings in real-time, at a very low cost, at a large scale. The United States has over 200,000 grade crossings and over 140,000 miles of railroad tracks, more than any other nation in the world. Each grade crossing represents a potential collision hazard between highway users (people and cars) and trains. Also, each train passing the grade crossing can cause highway traffic stoppage and delay. Grade crossing safety has long been a high priority for USDOT and transportation industry. Each year, billions of dollars are spent to monitor, modify, and improve grade crossings. The grade crossing related decision is very capital-intensive and hard to make.

Tackling this challenge requires high-quality data for railway conditions, including but not limited to:
1. Trespassing occurrence and behavioral data
2. Traffic volume data (pedestrian and automobile)
3. Health monitoring of warning devices (e.g. red signal, gate)
4. Grade crossing blockage time (i.e. the time for a train to clear a crossing, during this time, highway traffic has to stop, causing traffic delay)
5. Vehicle or people stop and struck the track
6. Suicidal commitment Embodiments of the present disclosure addressing cost and scaling issues with monitoring and analyzing all the locations by first to gathering the main types of the railway condition-related information (trespassing, traffic, warning device health and grade crossing blockage time). The technology can provide detected information using specially configured and train machine learning techniques, record the imagery and detected information into a database for machine learning-based analysis and prediction of railway condition metrics, trigger real-time alerts, display visual information via a user-end software, and recommend grade crossing safety improvement actions. In some embodiments of the present invention, an amalgam of computer vision techniques and custom trained neural networks may be combined to provide critical data to railroad customers with improved efficiency and accurate to enable the analysis of large volumes of imagery data from the extensive amount of locations needing monitoring.

In some embodiments, the term "railway condition" refers to a state of objects, persons, railway infrastructure, railway infrastructure components, the actions and/or behaviors of objects, persons, railway infrastructure, railway infrastructure components, among other things affecting the operation, servicing, maintenance, and safety of vehicles and infrastructure on a railway.

In some embodiments the term "railway condition metrics", "railway metrics" or "condition metrics" may refer to the measurement, quantification, detection, and/or statistical analysis of railway conditions and/or times of occurrence or detection associated with one or more railway conditions.

Similarly, there are over 140,000 miles of railroad tracks in the United States. This network is maintained by a combination of public and private agencies, each responsible for providing safe freight and transit service to their customers while minimizing potential collision hazards and delays due to obstructions, infrastructure defects and deterioration, etc. The recent development and deployment of technologies like 5G, low-cost high-resolution cameras and artificial intelligence algorithms have provided an opportunity to turn every train into a railroad big data collector.

In some embodiments, artificial intelligence algorithms of the present disclosure enable the recognition of objects and/or the behaviors of objects in video footage, ranging from people to railroad track components. When coupled to high resolution video footage and high speed wireless communication devices mounted on locomotives, each train can analyze the environment around them and provide real-time information. This software can provide value ranging from counting the number of passengers on a platform for service evaluation to recognizing broken rails for remediation. This software could provide the next level of real-time analytics for railroads and transit agencies.

In some embodiments, an intelligent railway analytics platform 100 may include hardware and/or software for receiving, processing and analyzing real-time and historical imagery from a network of fixed location and vehicle mounted image sensing devices (e.g., cameras (RGB color camera), thermal camera, infrared camera, LIDAR, among others or any combination thereof) to automatically monitor and assess railway conditions. In some embodiments, the intelligent railway analytics platform 100 may one or more layers of hardware or software or any combination thereof, including an image capture layer 110, an image processing layer 120, a railway analytics layer 130, a database layer 140, a decision support layer 150, or any other suitable logical or structural layer or any combination thereof.

Herein, the term "image sensing device", "imaging device" and/or "camera" refer to one or more of cameras (RGB color camera), thermal camera, infrared camera, LIDAR, among others or any combination thereof. Herein, the term "image" and/or "image data" refers to data generated by an "image sensing device", "imaging device" and/or "camera".

In some embodiments, each layer of the intelligent railway analytics platform 100 may include any suitable combination of software elements and hardware elements. Hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU), graphical processing unit (GPU), neural processing unit (NPU), resistive processing unit (RPU), tensor processing unit (TPU), or any other suitable processing device and/or processing system or any combination thereof. In some embodiments, the one or more processors may be connected to or otherwise in electronic communication with one or more data storage devices such as, e.g., a hard drive, solid-state drive, flash drive, or other suitable storage device. In some embodiments, the data storage devices may, additionally or alternatively, include one or more temporary storage devices such as, e.g., a random-access memory, cache, buffer, or other suitable memory device, or any other data storage solution and combinations thereof. Software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the intelligent railway analytics platform 100 may include any suitable combination of hardware or software or both deployed at the edge, in a cloud platform, or in a hybrid implementation including any combination of hardware and software deployed across edge devices and cloud platforms. In some embodiments, the edge or edge devices may include any suitable computing device locate locally at a network endpoint, such as a user computing device, internet of things device, mobile computing device, wearable device, imaging device, or other suitable computing device. In some embodiments, a cloud platform may include any suitable operating system and hardware of a server in an Internet-based data center that allows software and hardware products to co-exist remotely and at scale.

In some embodiments, the imaging layer 110 of the intelligent railway analytics platform may include imaging devices for image data capture of a railway environment. In some embodiments, the imaging devices may fall into any number of environment categories, such as vehicle-mounted imaging devices 114 and fixed location imaging devices 112, though any other railway environments or environment types may be employed.

In some embodiments, the imaging devices may include any suitable imaging device for capturing image data. For example, the imaging devices may include, e.g., digital cameras capable of capture still images and/or video, infrared imaging devices, CCDs, thermal camera, infrared camera, LIDAR, or other imaging devices to capture periodic or continuous image data of the railway environment or any combination thereof.

In some embodiments, the fixed location imaging device 112 may include imaging devices installed in a fixed location with at least one railway environment in a field of view of the imaging devices. In some embodiments, the fixed positing imaging device 112 may be positioned at any suitable location where trespass, obstruction or other impedance to train operation may take place. In some embodiments, the railway environment associated with the fixed location imaging device may include a grade crossing 113, right of way, station, tunnel, overpass, underpass, or any other suitable location. Simply as an example of these locations, the grade crossing 113 may be described here, but the location may be any other suitable location.

In some embodiments, the fixed location imaging device 112 may produce fixed location image data 101 of the grade crossing 113. In some embodiments, the fixed location image data may include, e.g., periodically or continuously generated imagery of the grade crossing 113. In some embodiments, periodically generated fixed location image data 101 may include, e.g., a period once per second, thirty seconds, minute, five minutes, ten minutes, fifteen minutes, half hour, hour, two hours, three hours, or other suitable period. In some embodiments, the period may vary throughout a day, such as, e.g., once per minute during rush hour periods and once per hour outside of rush hour periods, or other suitable variation. In some embodiments, continuously generated imagery may include, e.g., a video feed having any suitable framerate, such as, e.g., 5 frames per second, 10 frames per second, 24 frames per second, 30 frames per second, 60 frames per second, or other suitable framerate.

In some embodiments, the vehicle mounted imaging device 114 may be mounted to a railway vehicle 115, such as a train including, e.g., subway trains, commuter trains, high speed trains, freight trains, etc. In some embodiments, the vehicle mounted imaging device 114 may include, e.g., one or more forward facing imaging devices, rearward facing imaging devices or downward facing imaging devices or any combination thereof.

In some embodiments, the vehicle mounted imaging device 114 may produce moving image data 102 of the railway during operation of the railway vehicle 115. In some embodiments, the moving image data 102 may include, e.g., periodically or continuously generated imagery of the railway. In some embodiments, periodically generated moving image data 102 may include, e.g., a period once per second, two seconds, three seconds, five second, ten seconds, thirty seconds or other suitable period. In some embodiments, the period may vary throughout a day, such as, e.g., once per minute during rush hour periods and once per hour outside of rush hour periods, or other suitable variation, or by position, such as based on proximity to stations, urban areas, grade crossings, tunnels, overpasses, underpasses, bridges, etc. In some embodiments, continuously generated imagery may include, e.g., a video feed having any suitable framerate, such as, e.g., 5 frames per second, 10 frames per second, 24 frames per second, 30 frames per second, 60 frames per second, 120 frames per second or other suitable framerate.

In some embodiments, the fixed location image data 101 and the moving image data 102 may each include location data, time data, or any other suitable data. For example, in some embodiments, each image including each still image and/or each frame of each video feed may include a time stamp of a time and date of capture.

Additionally, the fixed location imaging device 112 and the vehicle mounted imaging device 114 may include a location determination components. For example, the fixed location imaging device 112 and the vehicle mounted imaging device 114 may include global positioning system (GPS) location devices to determine a location based on GPS data. In some embodiments, the fixed location imaging device 112 may be located at a predetermined location, and thus may omit the GPS device. Rather, the fixed location image data 101 may include a reference associated with the predetermined location, such as, e.g., a location identifier, an imaging device identifier, an address, a grade crossing identifier, latitude-longitude coordinates, or other suitable location reference.

In some embodiments, the vehicle mounted imaging device 114 may include a non-GPS locating component, such as, e.g., hardware and/or software configured to recognize a location from the moving image data 102, station arrival and departure data, track checkpoints, or other location determination technique.

In some embodiments, the fixed location image data 101 and the moving image data 102 may include metadata or other headers and/or tags identifying the location of each image and/or video frame.

In some embodiments, an image data feed of the fixed location image data 101 and an image data feed of the moving image data 102 may be provided to the image processing layer 120. In some embodiments, the image processing layer 120 may include local or edge compute local to each imaging device 112 and 114, or remote compute (e.g., at a remotely located computing device or in a server or cloud platform), or any combination thereof.

In some embodiments, the image processing layer 120 may include a fixed location image processing model engine 122 having one or more railway condition machine learning models for detecting and tracking people, objects, trains, and other things within each fixed location image in an image data feed of the fixed location image data 101. In some embodiments, the fixed location image processing model engine 122 may include one or more machine learning models and image processing algorithms for identifying at least one object in each image frame of the image frames provided by the fixed location image data 101.

In some embodiments, the image processing layer 120 may use the one or more machine learning models and image processing algorithms to detect objects and/or object behaviors/movements with respect to a track area, a grade crossing, a right of way, a station or platform, or other portion of the railway. In some embodiments, the image processing layer 120 may initially screen for warning conditions, such as, e.g., an object or person on a track while a train approaches, a broken rail or tie or other railway infrastructure component, among other hazardous conditions. In some embodiments, the hazardous conditions may automatically trigger an alert to a train operator, a driver or conductor, safety crews, maintenance teams, emergency medical services, among other users upon detection of the hazardous condition.

In some embodiments, the fixed location image processing model engine 122, for example, may include machine learning models architected and trained to identify grade crossing and/or right of way objects and events such as, e.g., a grade crossing signal status, obstacles and/or obstructions in the grade crossing or right of way, people and/or vehicles in the grade crossing or right of way, among other objects or events or any combination thereof.

In some embodiments, the fixed location image processing model engine 122 may include a grade crossing recognition machine learning model to automatically recognize a grade crossing area. However, in some embodiments, because the fixed location imaging device 112 is installed in a fixed location, to improve computation efficiency the grade crossing area may be predefined as particular region of images produced by the fixed position imaging device 112 or as the entire region captured in the images. Similarly, where the grade crossing 113 is instead a right of way or other railroad environment, the region of interest may be automatically detected by a trained machine learning model or predefined according to a region within each image based on the location of the fixed location imaging device 112.

In some embodiments, the fixed location image processing model engine 122 may include a first machine learning model, such as a first neural network or other suitable machine learning model for object detection, trained to detect a signal event. In some embodiments, grade crossings may include signal lights that flash red when a train is nearby and passing through, and is otherwise off. Thus, a signal event can include the activation of the flashing of the red signal light. Thus, the first machine learning model may be trained on a first training dataset of grade crossing imagery where each image is labeled according to the signal status. In some embodiments, based on the grade crossing imagery and the labels, the first machine learning model may be trained to correlate the flashing of the signal light with the signal status event as a flashing status, or otherwise as an off status where the signal light is not flashing, and thus automatically annotate images of the fixed location image data 101 with the signal status of the signal light at a grade crossing. However, at other locations, such as rights of way, overpasses and underpasses, tunnels, bridges, etc. where signal lights may not be employed, this machine learning model can be skipped.

In some embodiments, the machine learning models of the fixed location image processing model engine 122 may further include an object recognition machine learning model. In some embodiments, the object recognition machine learning model may ingest each image of the fixed location image data 101 to identify objects present within the grade crossing area 113 at the time of each image. In some embodiments, the object recognition machine learning model may be trained to detect and track objects including, e.g., people, vehicles, obstructions, trains, among other objects.

Accordingly, in some embodiments, the object recognition machine learning model may be trained using training dataset of annotated image. The annotated images may include grade crossing imagery with a variety of objects present in the grade crossing area, including people, vehicles, obstructions, trains, no objects, etc. Thus, the object recognition machine learning model may predict an annotation for each annotated image, which may be compared against the actual annotation. Based on the error between the predicted annotation and the actual annotation, the object recognition machine learning model may be trained to correctly identify objects within the grade cross area.

In some embodiments, the object recognition model may be trained to detect objects and events only when the objects and/or events are within the grade crossing area. For example, the fixed location image processing model engine 122 may include a pre-processor that crops each image of the fixed location image data 101 to only include the grade crossing area. Thus, the object recognition machine learning model may generate an annotation based on whether an object appears within the grade crossing area. Where an object is not within the grade crossing area, no annotation or an annotation of no object is produced because objects outside of the grade crossing area do not appear in the cropped images.

In some embodiments, instead of a preprocessor, the fixed location image processing model engine 122 may include a post-processor that compares the annotation of the detected object of each image to the region of interest defined by the grade crossing area. Where the annotation of the detection object indicates that the object is outside of the region of interest in the frame of the image, the post-processor may determine that the detected object is not in the grade crossing area and modify the annotation to reflect that.

In some embodiments, the object recognition machine learning model may be train to only label objects within the grade crossing area. Thus, the object recognition machine learning model may only predict an annotation for a recognized object where the object is within the grade crossing area. Alternatively, or additionally, the object recognition machine learning model may include a multi-label classification where each object is labeled as the recognized object and its status as either inside or outside the grade crossing area.

Accordingly, in some embodiments, the fixed location image processing model engine 122 may detect objects and based on the detected objects, the grade crossing area and the signal status, whether the object such as a person or vehicle trespasses into the grade crossing area, or whether the object is a non-person and non-vehicle and obstructs the grade crossing area or otherwise present an obstacle to a train passing through. For example, an object may be identified as a trespass where it is a detected person or vehicle that is within the grade crossing area during the flashing status of the signal light. However, inanimate objects, such as downed trees, collapsed structures or other objects may be classified as an obstacle or obstruction where the object is within the grade crossing area regardless of whether the signal status is a flashing status or an off status.

In some embodiments, the vehicle mounted imaging device 114 may also provide an image data feed of moving vehicle image data 102 to the image processing layer 120. In some embodiments, the image data feed of the moving vehicle image data 102 may include a feed of forward-facing images and/or rear-facing images from the vehicle mounted imaging device 114 mounted on a front and/or rear of a vehicle such as a train. The following description uses the forward-facing vehicle mounted imaging device 114 producing forward-facing images as illustrative of aspects of embodiments of the intelligent railway analytics platform 100, but similar aspects may be implemented using a rear-facing vehicle mounted imaging device 114 producing rear-facing images, or both the forward-facing and rear-facing vehicle mounted imaging devices 114. In some embodiments, the forward-facing images may result from an orientation of the vehicle mounted imaging device 114 that is facing a direction of travel of the vehicle. In some embodiments, based on the image data feed, the moving vehicle image processing model engine may include one or more railway condition machine learning models that may detect, e.g., objects, obstacles, obstructions, persons, vehicles, stations, a track area, track area components (e.g., rails, ties, etc.), defects, infrastructure (e.g., tunnels, bridges, switches, etc.), among other objects.

In some embodiments, the moving vehicle image processing model engine 124 may include a track area detection model that may include a machine learning model for detecting a track area in front of the vehicle 115, such as, e.g., a neural network or other object detection and/or object recognition machine learning model.

Accordingly, in some embodiments, the track area detection model may be trained using training dataset of annotated images. The annotated images may include at least some images of a forward-facing perspective of a railway from a railway vehicle. In some embodiments, the images having the forward-facing perspective may be annotated to label the track area. Thus, the track area detection model may predict an annotation for each annotated image, which may be compared against the actual annotation. Based on the error between the predicted annotation and the actual annotation, the track area detection model may be trained to correctly identify track areas in a forward-facing perspective.

Accordingly, in some embodiments, the track area detection model may ingest the image data feed from the moving vehicle image data 102, and based on the training, automatically predict a label identifying the track area within each image. Based on the detected track area of each image, the moving vehicle image processing model engine 124 may identify objects as within or outside the track area, and thus classify detected objects as obstacles, obstructions, trespasses and other conditions.

In some embodiments, to detect objects in each image, the moving vehicle image processing model engine 124 may include machine learning models to detect various objects and conditions of the railway environment. In some embodiments, a railway condition recognition model may include a machine learning model for object detection, such as, e.g., a neural network or other object detection and/or object recognition machine learning model.

Accordingly, in some embodiments, the object recognition machine learning model may be trained using training dataset of annotated image. The annotated images may include forward-facing track imagery with a variety of objects present in the track area, including people, vehicles, obstructions, trains, no objects, etc. Thus, the object recognition machine learning model may predict an annotation for each annotated image, which may be compared against the actual annotation. Based on the error between the predicted annotation and the actual annotation, the object recognition machine learning model may be trained to correctly identify objects within the track area.

In some embodiments, the object recognition model may be trained to detect objects and events only when the objects and/or events are within the track area. For example, the moving vehicle image processing model engine 124 may include a pre-processor that crops each image of the moving vehicle image data 102 to only include the track area. Thus, the object recognition machine learning model may generate an annotation based on whether an object appears within the track area. Where an object is not within the track area, no annotation or an annotation of no object is produced because objects outside of the track area do not appear in the cropped images.

In some embodiments, instead of a preprocessor, the moving vehicle image processing model engine 124 may include a post-processor that compares the annotation of the detected object of each image to the region of interest defined by the track area. Where the annotation of the detection object indicates that the object is outside of the region of interest in the frame of the image, the post-processor may determine that the detected object is not in the track area and modify the annotation to reflect that.

In some embodiments, the object recognition machine learning model may be trained to only label objects within the track area. Thus, the object recognition machine learning model may only predict an annotation for a recognized object where the object is within the track area. Alternatively, or additionally, the object recognition machine learning model may include a multi-label classification where each object is labeled as the recognized object and its status as either inside or outside the track area.

Accordingly, in some embodiments, the moving vehicle image processing model engine may detect objects and based on the detected objects and the track area, whether the object such as a person or vehicle trespasses into the track area, or whether the object is a non-person and non-vehicle and obstructs the track area or otherwise present an obstacle to a train passing through. For example, an object may be identified as a trespass where it is a detected person or vehicle that is within the track area. However, inanimate objects, such as downed trees, collapsed structures or other objects may be classified as an obstacle or obstruction where the object is within the track area.

In some embodiments, where a trespass and/or obstruction is detected, the moving vehicle image processing model engine 124 may utilize distance and speed measuring models to determine how far the trespass or obstruction is from the vehicle 115 and how fast the vehicle 115 is moving.

In some embodiments, a railway condition recognition model may include a machine learning model for determining a distance measurement between the vehicle 115 and detected objects within the track area. In some embodiments, the distance measurement model may include a neural network (e.g., a convolution neural network (CNN) such as U-net CNN) or other machine learning model for inferring a measurement. In a training stage, firstly, the distance measurement model may be trained via a self-learning way. This training stage may include minimizing the re-projection error of either: (i) two consecutive frames of the image data feed where the image data includes monocular images, or (ii) a pair of images wherein the image data includes stereo images.

In some embodiments, the training may train the distance measurement model to generate a relative distance of each pixel between the two images. Secondly, given some ground-truth absolute distances annotated for relative distances in a training dataset, a curve-fitting function is trained for mapping any relative distance to an absolute distance. In an inference stage, the distance measurement model may generate relative distances for every pixel between any two consecutive monocular images or between the images of a stereo image pair, and convert the relative distances to absolute distances according to the learned curve-fitting function. In some embodiments, the distance measurement model may then take the average of the absolute distances of a local patch centered at a detected object as its estimated distance. In some embodiments, the distance measurement model may be used to objects in the track area as well as for objects outside of the track area.

In some embodiments, a speed measurement model may be employed to determine the speed of the vehicle 115. In some embodiments, the speed measurement model may include alternative algorithms for speed estimation. A first example of an alternative algorithm includes training a CNN-based model directly with the average optical flow of four (4) consecutive frames for speed estimation. A second example of alternative algorithm may be based on the distance measurement and corner detection. The main idea is finding and tracking stationary objects in the track area whose relative speed to the camera would be close to the train's speed. Meanwhile, the real-time speed of these objects may be obtained with pixel-wise distance matrix calculated by MonoDepth2. The third algorithm is detecting ties of the track when they are visible. Based on each tie (or other infrastructure component or marking system to mark spacing) in the track, which have a predefined and standardized gap between ties, a suitable object tracking algorithm (e.g., DeepSORT or other object tracker) may be employed to count a number of ties that the vehicle passes within a given amount of time. In some embodiments, based on a predefined length of a tie and the predefined gap between ties, the number of ties in the give amount of time may be used to determine the speed of the train by calculating a distance traveled according to the number of ties, length of the ties and the gap between ties, and dividing that distance by the given amount of time. The algorithms described above can be used, individually or in combination, depending on the image quality, resolution, operating circumstances and other factors.

In some embodiments, the object recognition model may also be trained to detected people and train platforms and/or train stations. Thus, where a train platform or train station is detected, the moving vehicle image processing model engine 124 may utilize a counting algorithm to determine a number of passengers on the train platform or at the train station. In some embodiments, to do so, the object recognition model may detect each person in an image of the train platform or train station. The moving vehicle image processing model engine 124 may then automatically tally or count the number of people based on each detected person to determine a number of people awaiting a train.

In some embodiments, the moving vehicle image processing model engine 124 may include one or more defect detection models to detection a defect railway condition. In some embodiments, the defect detection model(s) may be trained to recognize infrastructure defects on rails, ties, track geometry, ballast, bridge parts, tunnel walls and ceilings, among other railway infrastructures. In some embodiments, the defect detection model(s) may include a machine learning model for identifying infrastructure defects based on the images of the moving vehicle image data 102, such as, e.g., a neural network or other object detection and/or object recognition machine learning model.

Accordingly, in some embodiments, the defect detection model(s) may be trained using training dataset of annotated image. The annotated images may include forward-facing track imagery with a variety of infrastructure defects present in the track area, including rail wear, rail geometry defects, track geometry defects, ballast defects, tie deterioration, tunnel wear and deterioration, bridge wear and deterioration, tunnel damage, bridge damage, among other infrastructure defects. Thus, the defect detection model(s) may predict an annotation for each annotated image, which may be compared against the actual annotation. Based on the error between the predicted annotation and the actual annotation, the defect detection model(s) may be trained to correctly identify infrastructure defects within the track area.

In some embodiments, where defects are detected, the moving vehicle image processing model engine 124 may utilize the distance measurement model for determine a distance between the vehicle 115 and the detected defect as described above.

In some embodiments, the detected obstacles and obstructions, trespasses, signal statuses, infrastructure defects, stations, platforms, people, distances, speeds, and any other objects and railway conditions (collectively "railway features") detected by the fixed location image processing model engine 122, the moving vehicle image processing model engine 124 or both may be provided to the railway analytics layer 130. In some embodiments, the railway analytics layer may include a safety module 132, a service module 124 and an engineering module 136 for assessing railway condition metrics for safety conditions, service conditions and engineering conditions, respectively. Some embodiments, each module of the railway analytics layer 130 may produce railway conditions and railway condition metrics based on the detected railway features, associated times based on the time stamp of each image of the fixed location image data 101 and the moving vehicle image data 102, and the location associated with each image of the fixed location image data 101 and the moving vehicle image data 102.

In some embodiments, where the images do not include location data, for example where GPS data include an error or is absent, the analytics layer may determine a location for each detected railway feature based on an analysis of the objects detected outside of the track area of a particular image and the images before and after the particular image. In some embodiments, the analytics layer 130 may catalog sequences of detected objects detected outside of the track area in the images These sequences may be correlated to a particular geospatial location, e.g., by manual identification, GPS references, or by other manual or automated techniques. Thus, the objects detected outside of the track area and order thereof in the particular image and the images before and after the particular image may be compared to the cataloged sequences of objects. Where a match to a sequence of objects is found, the location of the particular image may be identified as the location associated with the matching sequence and the placement of the objects of the particular image in an order of the matching sequence.

More specifically, an adaptive algorithm can be implemented using the following analytical protocol. Suppose that train speed is known or estimated in real-time, the analytics layer may calculate the distance between the current location and the start point (e.g. origin station). The next step is to create a continued function that maps distance to geo-location. It is feasible since a train's route is typically fixed and may provide available APIs to obtain a sequence of geo-location coordinates along a route. With these coordinates, the analytics layer 130 may further calculate the distance between the start and other points (coordinates) using map APIs (e.g. Google Maps or BING Maps). The analytics layer 130 may then estimate the current geo-location by inputting the current distance (from the start) to the mapping. Recognizing that the speed estimation may not be exact, the analytics layer 130 may further improve geo-location accuracy with the key point matching method. For some geo-locations, the analytics layer 130 may store their coordinates and visual features in a track database. While the train is running, the analytics layer 130 may compare the similarity between the current image and those geo-locations in real time. Once the current image is close to one of the pre-stored images in the track database, the analytics layer 130 may determine that that the train is close to that location and may also revise the train's estimated location accordingly if needed. The features of key points can be updated periodically as needed.

In some embodiments, based on the time, location and railway features of each image, railway conditions may be assessed for patterns and metrics.

In some embodiments, the safety module 132 may receive obstacles and obstructions to determine obstacle and/or obstruction railway conditions for the location of each image for which an obstacle or obstruction is detected. Accordingly, for each detected obstacle or obstruction, the safety module 132 may generate an entry or record to store details of the obstacle or obstruction, including a time associated with the image in which the obstacle or obstruction is identified, a location (e.g., via GPS data and/or object sequence matching described above) associated with the image in which the obstacle or obstruction is identified, among other details. In some embodiments, the entry or record may include attributes for classifying railway condition as an obstacle or obstruction, the time, the location, and, for vehicle mounted image data 102, the distance from the vehicle 115 and speed of the vehicle. In some embodiments, the entry or record for each detected obstacle or obstruction, the safety module 132 may aggregate statistics, such as, e.g., location-based averages, time-based averages, frequency, one or more distributions, frequency by type or specific object, etc.

Similarly, in some embodiments, the safety module 132 may receive trespasses to determine person or vehicle trespass railway conditions for the location of each image for which a trespass is detected. Accordingly, for each detected trespass, the safety module 132 may generate an entry or record to store details of the trespass, including a time associated with the image in which the trespass is identified, a location (e.g., via GPS data and/or object sequence matching described above) associated with the image in which the trespass is identified, among other details. In some embodiments, the entry or record may include attributes for classifying railway condition as a person trespass or a vehicle trespass, the time, the location, and, for vehicle mounted image data 102, the distance from the vehicle 115 and speed of the vehicle. In some embodiments, the entry or record for each detected trespass, the safety module 132 may aggregate statistics, such as, e.g., location-based averages, time-based averages, frequency, one or more distributions, frequency by type or specific object, etc.

In some embodiments, the entry or record of a particular trespass may be generated by aggregating the attributes of each image having a common detected person or vehicle in a common location over a consecutive series of images. Thus, each consecutive image having the common detected person or vehicle at the common location may be used to produce the entry or record of the particular trespass. Thus, the safety module 132 may use the consecutive images to record the location, the person or vehicle, a start time, an end time, a duration, among other trespass attributes extracted from the consecutive images.

In some embodiments, the safety module 132 may analyze images having the same detected persons or vehicles at a same location. Based on the time stamps of the images, the safety module 132 may determine a duration of the trespass. In some embodiments, where the duration has not ended, e.g., the last image frame having the trespass is from a current time, a suicide attempt may be determined. In some embodiments, the safety module 132 may generate an alert to one or more users via one or more computing device in real-time to alert the users of the suicide attempt. The suicide attempt may then be added to the entry or record of the trespass. The suicide attempt can be inferred by recognizing the location and behavior of a person. For example, if a person loiters around the track (spends more than a predetermined amount of time around the track area), lies on the track, or has other "abnormal" behaviors instead of intending to pass the area, it could be identified as potential suicidal attempts.

In some embodiments, the trespasses may be filtered according to signal status. As described above, the fixed location image processing model engine 122 may automatically detect trespasses based on detected people or vehicles within the grade crossing area. Similarly, the moving vehicle image processing model engine 124 may automatically identify trespasses based on detected people or vehicles being within the detected track area. However, in some embodiments, the fixed location image processing model engine 122 and/or the moving vehicle image processing model engine 124 may provide detected people and/or vehicle and the grade crossing area and track area to the safety module 132, and the safety module 132 may filter the images to identify images with a trespass where the detected people and/or vehicle are within the grade crossing area and track area.

In some embodiments, based on the distance and/or speed of the vehicle 115 and/or the location of the obstacle, obstruction or trespass, the safety module 132 may automatically generate an alert to a user or driver to alert the user or driver of the obstacle, obstruction or trespass. In some embodiments, where the obstacle, obstruction or trespass is detected, a safety hazard may be presented to the vehicle 115, to other railway vehicles, to the trespasser and to nearby people and property. Accordingly, the safety module 132 may automatically generate an alert to any railway vehicles near to the obstacle, obstruction or trespass based on the location and a location of each railway vehicle. In some embodiments, such alert may include an automated instruction to the railway vehicle drive systems to automatically begin braking according to the speed and distance to the obstacle, obstruction or trespass.

In some embodiments, the service module 134 may ingest the image frames from the image processing layer 120. In some embodiments, the service module 134 may filter the images according to whether a station or platform was detected. For the images where a station or platform was detected, the service module 134 may extract each person detected in each image and count the number of persons on the platform or at the station. All related image frames may be used for the passenger counting. Counting people on the platform includes detection and tracking of people as well as detection of the platform. The detection of people can be based on neural networks (e.g. YOLO). People tracking can be performed using heuristic algorithms such as DeepSORT. The detection of railway platform can reply on recognizing whether there is a tactile lane with specific patterns in the image. In addition, the service module 134 may also train a light-weight CNN classifier (or other alternative neural network methods) to differentiate passengers and track workers or railway personnel. This differentiation enables counting of only passengers (not railway workers or professionals) on the platform.

In some embodiments, using the number of persons, the service module 134 may generate passenger metrics. For example, at each arrival at a station or platform, a date and time, the number of persons, a location, and additional external data, e.g., weather, traffic information, holidays, etc. may be recorded in a passenger demand entry or record. Passenger demand may then be assessed based on time, location, weather and other factors to determine trends and statistics in numbers of people waiting for trains, which may be used as a proxy for passenger volume and/or demand volume.

In some embodiments, the engineering module 136 may ingest the image frames from the image processing layer 120. In some embodiments, the engineering module 136 may use the images and detected railway conditions and railway features to determine engineering status and engineering conditions of the railway. In some embodiments, the engineering module 136 may use the fixed location image data 101 to determine grade crossing operation and train operation related metrics, while the engineering module 136 may use the moving vehicle image data 102 to determine infrastructure related defects and deterioration.

In some embodiments, the engineering module 136 may use the detected flashing signal statuses to determine gate operations. For example, in some embodiments, a delay between the flashing status and the activation of the gate may be determined for each time the signal enters a flashing state. Similarly, when the signal transitions from a flashing status to an off status, the delay until gate activation may be measured. Accordingly, metrics and statistic related to whether and how quickly the gate is activated may be generated.

In some embodiments, the operation of the gate may also be used to trigger trespass detection. Accordingly, the engineering module 136 may communicate with the safety module 132 such that when gate operation is detected, the safety module 132 is instructed to determine a trespass condition based on detected persons or vehicles in the gate crossing area for the time of the gate operation. Thus, the engineering module 136 may facilitate efficient determination of trespass metrics by avoiding trespass detection analysis when the gate has not been activated.

In some embodiments, the engineering module 136 may also compare detected trains in the gate crossing area with the signal status and gate activation. In some embodiments, the delay between a flashing status of the signal and an arrival of a train may vary. Long delays may negatively impact traffic flow by unnecessarily limiting vehicle crossing when the train indicated by the signal is far away. Thus, the engineering module 136 may compare a time stamp of an image where the flashing status is first detected and a time stamp of an image where a train is first detected in the gate crossing area. Based on a difference in the time stamps, the delay between the flashing status and the train arrival may be determined. An entry or record for train arrival delay may be generated based on the delay. In some embodiments, the detection of the train by the fixed location image processing model engine 122 may also include detection of a train type and/or train length. The train type and/or the train length may be appended to the train arrival delay entry or record to facilitate generating train arrival delay metrics and statistics according to train characteristics, such as an average delay according to train length, an average delay according to train type, a distribution of delay according to train length, a distribution of delay according to train type, among others.

In some embodiments, the engineering module 136 may also compare the signal status and gate activation to determine an amount of time between a signal activation and signal off status. In some embodiments, the delay between a flashing status of the signal and an off status may vary. Thus, the engineering module 136 may compare a time stamp of an image where the flashing status is first detected and a time stamp of an image where an off status is first detected or the flashing status is last detected. Based on a difference in the time stamps, the grade crossing blockage time indicative of the amount of time the grade crossing is blocked to roadway traffic is determined.

In some embodiments, the engineering module 136 may receive the trespass conditions from the safety module 132. Using the trespass conditions, the engineering module 136 may determine a duration between a trespass condition and a train arrive and/or train departure from the grade crossing area in order to assess behaviors relative to train arrival and departure. Thus, the engineering module 136 may compare a time stamp of an image where the trespass is first detected and a time stamp of an image where a train is first detected in the gate crossing area. Based on a difference in the time stamps, the delay between the trespass and the train arrival may be determined. An entry or record for trespass-arrival delay may be generated based on the delay. In some embodiments, the detection of the train by the fixed location image processing model engine 122 may also include detection of a train type and/or train length. The train type and/or the train length may be appended to the trespass-arrival delay entry or record to facilitate generating trespass-arrival delay metrics and statistics according to train characteristics, such as an average delay according to train length, an average delay according to train type, a distribution of delay according to train length, a distribution of delay according to train type, among others.

In some embodiments, the engineering module 136 may also compare detected trains in the gate crossing area with the signal status and gate activation. In some embodiments, the delay between an off status of the signal and a departure of a train may vary. Long delays may negatively impact traffic flow by unnecessarily limiting vehicle crossing when the train indicated by the signal is far away. Thus, the engineering module 136 may compare a time stamp of an image where the off status is first detected and a time stamp of an image where a train is last detected in the gate crossing area. Based on a difference in the time stamps, the delay between the off status and the train departure may be determined. An entry or record for train departure delay may be generated based on the delay. In some embodiments, the detection of the train by the fixed location image processing model engine 122 may also include detection of a train type and/or train length. The train type and/or the train length may be appended to the train departure delay entry or record to facilitate generating train departure delay metrics and statistics according to train characteristics, such as an average delay according to train length, an average delay according to train type, a distribution of delay according to train length, a distribution of delay according to train type, among others.

In some embodiments, the engineering module 136 may receive the trespass conditions from the safety module 132. Using the trespass conditions, the engineering module 136 may determine a duration between a trespass condition and a train arrive and/or train departure from the grade crossing area in order to assess behaviors relative to train departure and departure. Thus, the engineering module 136 may compare a time stamp of an image where the trespass is first detected and a time stamp of an image where a train is last detected in the gate crossing area. Based on a difference in the time stamps, the delay between the trespass and the train departure may be determined. An entry or record for trespass-departure delay may be generated based on the delay. In some embodiments, the detection of the train by the fixed location image processing model engine 122 may also include detection of a train type and/or train length. The train type and/or the train length may be appended to the trespass-departure delay entry or record to facilitate generating trespass-departure delay metrics and statistics according to train characteristics, such as an average delay according to train length, an average delay according to train type, a distribution of delay according to train length, a distribution of delay according to train type, among others.

In some embodiments, the engineering module 136 may receive the trespass conditions from the safety module 132. Using the trespass conditions, the engineering module 136 may determine a duration between a train arrival and a train departure from the grade crossing area in order to assess the impact of trespasses on train movement. Thus, the engineering module 136 may compare a time stamp of an image where the train is first detected in the grade crossing and a time stamp of an image where a train is last detected in the gate crossing area. Based on a difference in the time stamps, the delay between the train arrival and the train departure may be determined. An entry or record for train progress delay may be generated based on the delay. In some embodiments, the detection of the train by the fixed location image processing model engine 122 may also include detection of a train type and/or train length. The train type and/or the train length may be appended to the train progress delay entry or record to facilitate generating train progress delay metrics and statistics according to train characteristics, such as an average delay according to train length, an average delay according to train type, a distribution of delay according to train length, a distribution of delay according to train type, among others.

Similarly, the engineering module 136 may use obstructions in addition or instead of the trespass to assess train progress delays. In some embodiments, the engineering module 136 may receive the obstruction conditions from the safety module 132. Using the obstruction conditions, the engineering module 136 may determine a duration between a train arrival and a train departure from the grade crossing area in order to assess the impact of obstructions on train movement. Thus, the engineering module 136 may compare a time stamp of an image where the train is first detected in the grade crossing and a time stamp of an image where a train is last detected in the gate crossing area. Based on a difference in the time stamps, the delay between the train arrival and the train departure may be determined. An entry or record for train progress delay may be generated based on the delay. In some embodiments, the detection of the train by the fixed location image processing model engine 122 may also include detection of a train type and/or train length. The train type and/or the train length may be appended to the train progress delay entry or record to facilitate generating train progress delay metrics and statistics according to train characteristics, such as an average delay according to train length, an average delay according to train type, a distribution of delay according to train length, a distribution of delay according to train type, among others.

In some embodiments, the engineering module 136 may use the defect detections from the moving vehicle image processing model engine 124 to generate defect metrics and analytics. In some embodiments, the engineering module 136 may filter and aggregate defects detected by the moving vehicle image processing model engine 124. Accordingly, for each image having a detected defect, the engineering module 136 may extract the defect and/or defect type (e.g., rail defects, ballast defects, track defects, tunnel defects, bridge defects, switch defects, etc.), a location associated with each image, a time associated with each image, a distance from the vehicle based on the distance determination described above, a speed of the train as determined above, among other attributes associated with each image having a detected defect.

In some embodiments, the engineering module 136 may include or have access to an installation and maintenance history of various railway infrastructure and infrastructure components. Thus, the engineering module 136 may further extract an age of the infrastructure in the images with detected defects, such as a length of time since an installation date of one or more infrastructure components at the location of the images. In some embodiments, the engineering module 136 may extract a most recent maintenance or servicing date, along with any available maintenance and servicing details from the history.

In some embodiments, the engineering module 136 may generate a defect entry or record or each defect detected. In some embodiments, each defect entry or record may include the defect, defect type, location, time, installation history, maintenance history, etc. to record defect attributes. In some embodiments, using the defect entry or record for each detected defect, the engineering module 136 may generate defect metrics characteristic defect patterns and distributions, e.g., by location and/or defect type, among other attributes. Accordingly, the engineering module 136 may generate defect metrics such as, e.g., frequency of defect type by location, frequency of defect type by infrastructure component, average inspection and maintenance interval, average lifespan of each infrastructure component, among other metrics or any combination thereof.

In some embodiments, the railway analytics layer 130 may provide each entry and/or record to the database layer 140 for storage and access. In some embodiments, each module of the railway analytics layer 130 may provide entries and records to an associated database. Accordingly, in some embodiments, the engineering module 136 may provide data to an engineering database 146, the service module 134 may provide data to a service database 144, and the safety module 132 may provide data to the safety database 142. In some embodiments, each database of the database layer 140 may be logical separated or physically separated, or any combination thereof.

In some embodiments, any one or more of the databases of the database layer 140 may include any suitable organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity—relationship database, an enhanced entity— relationship database, a document database, an entity—attribute—value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, a decision support layer 150 may access the database layer 140 to retrieve entries and records 103 for display on user interface dashboards of a user computing device via networked access to the decision support layer 150 or by downloading the entries and records 103 to the user computing device 160 or any combination thereof. In some embodiments, the decision support layer 150 may produce dashboard elements to show real-time railway conditions based on the imagery 101 and 102, real-time alerts of hazardous conditions, future condition predictions, recommendations to users and train operators, among other information. In some embodiments, the decision support layer 150 may produce visualizations to display in the user interface and depict the data analysis such as statistical analyses produced by the railway analytics layer 140.

In some embodiments, the decision support layer 150 may generate recommendations for grade crossing safety improvement decisions, railway infrastructure and station safety and servicing improvement decisions, among other recommendations.

In some embodiments, the user computing device 160 may include a computer onboard a train for use by an engineer or other train personnel. The user computing device 160 may include a railway operator computing device associated with employees of the railway operator such as, e.g., maintenance personnel, technology administrators, safety personnel, among others. In some embodiments, the user computing device 160 may also or alternatively be associated with third-party entities, such as, e.g., rail agencies, governmental departments of transportation, emergency responders, among others.

In some embodiments, the decision support layer 150 may include a recommendation engine 150 that uses a railway condition prediction model to predict a future railway condition based on current and/or historical railway conditions. In some embodiments, the future railway condition may include any one or more of a future operating conditions such as a future infrastructure defect, a future trespass or future obstruction or combination thereof, or a future operating demand such as a future passenger demand, or any other future railway condition or any combination thereof based on the entries and/or records generated by the railway analytics layer 140. In some embodiments, the predictions are based on collected historical data and statistical and/or machine learning models to predict an occurrence, likelihood of occurrence, duration or any combination thereof of a future railway condition.

In some embodiments, the recommendation engine 150 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the decision support layer 150 may include a library of state of the practice grade crossing and railway safety improvement options, such as, e.g., painting pavement markings, changing warning times, adding or modifying gate skirts, rail or tie or ballast repair options, etc. In some embodiments, each option may be associated with cost data, e.g., based on literature and practice. In some embodiments, users via the user computing device 160 may provide cost data manually for each displayed recommendation or for one or more options. In some embodiments, the cost data may include, e.g., up-front cost for each option, recurring costs for each option or both. Thus, in some embodiments, for each railway condition, the recommendation engine 150 may produce a recommendation based on data patterns from the analysis performed by the railway analytics layer 140 and the associated cost data from the library of improvement options. In some embodiments, the recommendations may be provided to the user computing device 160 to present railway improvement options based on real-time and historical railway conditions from feeds of fixed location image data 101 and moving vehicle image data 102.

Example 1—Vehicle Mounted Image Collection and Analysis

Detection Features

Figure 2:
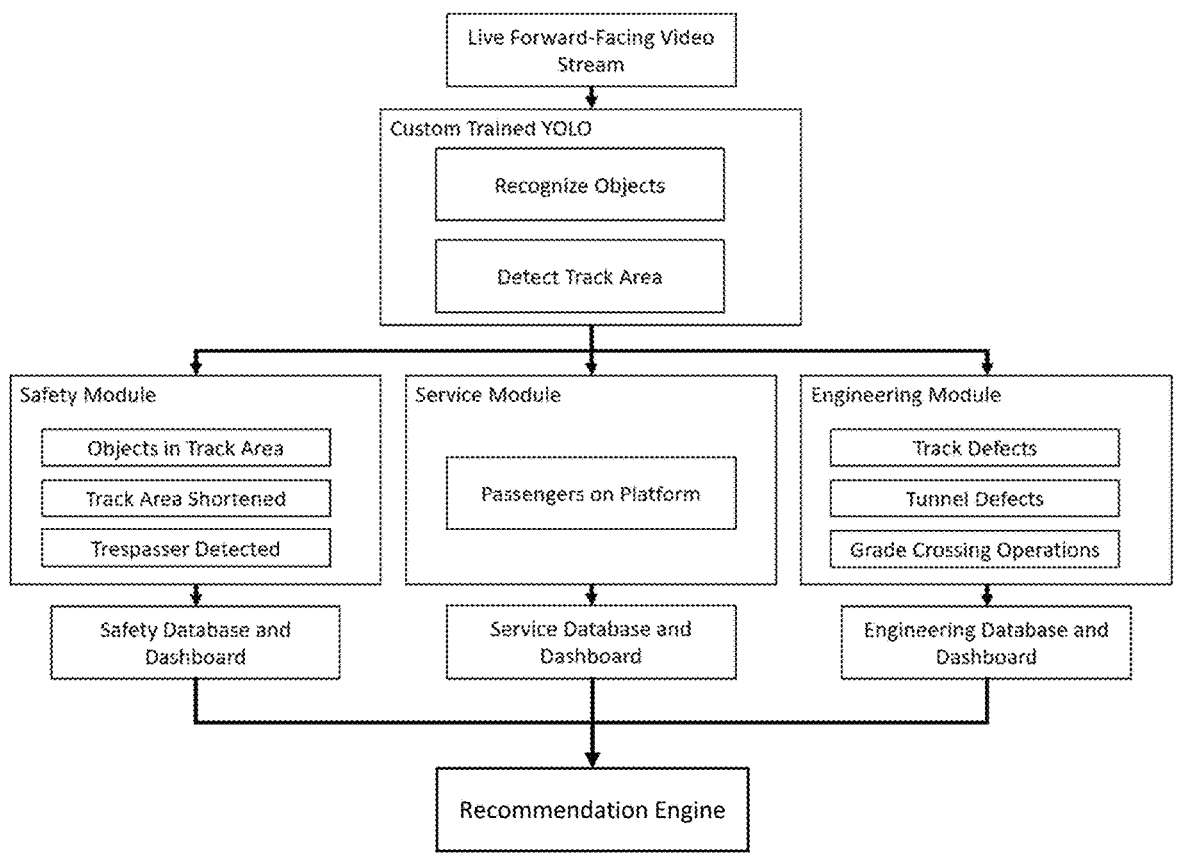
FIG. 2 depicts a block diagram of a vehicle mounted imaging pipeline of another illustrative intelligent railway analytics platform for predictive monitoring and assessment of railway conditions in accordance with one or more embodiments of the present disclosure.

Referring to FIG. 2 a moving vehicle image pipeline for vehicle mounted railway monitoring, assessment and prediction is depicted according to one or more embodiments of the present disclosure.

In some embodiments, the moving vehicle image pipeline focuses on providing information in three major domains: safety, service and engineering. The moving vehicle image pipeline can recognize obstructions and trespassers ahead of the train and raise alerts. From a service perspective the tool can count passengers at stations. In the engineering domain the tool may be able to detect track defects, tunnel defects, railroad crossing failures and signal statuses.

In some embodiments, the safety module of the moving vehicle image pipeline may determine obstruction distance, train and relative speed detection, and trespassing detection. In some embodiments, the obstruction distance and the train and relative speed detection may employ two-frame motion estimation based on polynomial expansion. The trespassing detection may utilize a custom trained neural network for inferencing such as but not limited to, e.g., a You-Only-Look-Once (YOLO) inferencing model.

In some embodiments, the service module of the moving vehicle image pipeline may determine passenger counts at stops and stations along the railway. The passenger counts may be determined using a custom trained neural network for inferencing such as YOLO inferencing.

In some embodiments, the engineering module of the moving vehicle image pipeline may determine rail track defect detection using a custom trained convolutional neural network such as, e.g., a You-Only-Look-Once (YOLO) inferencing model and custom ruleset based on the defect detection. The engineering module may perform tunnel inspection using a custom trained neural network for inferencing such as YOLO inferencing, and may perform railroad crossing inspection using custom trained machine learning inference such as YOLO inferencing.

In some embodiments, the moving vehicle image pipeline functions in three major steps; loading the live stream, recognizing objects with a custom trained inferencing model and analyzing the detected objects for safety, service and engineering metrics. The first step is accomplished by loading a live stream, but archival videos have been used during the development of this software. The second step uses any suitable machine learning inferencing model such as a neural network, e.g., the YOLOv5 convolutional neural network, trained on a dataset of custom annotated images and common objects in context (COCO) annotated images. In some embodiments, these objects are, person, bicycle, car, motorcycle, bus, train, truck, traffic light, stop sign, bench, bird, cat, dog, horse, sheep, cow, elephant, bear, zebra, giraffe, rail.

In some embodiments, following the detection, the safety module may evaluate if objects are within the track area, or if the track area has shortened suddenly. If either of these criteria are satisfied an obstacle or obstruction notification may be raised and an entry may be made into the database. Similarly, if a person is detected in the track area or surrounding buffer area, a video clip may be recorded and an entry may be made into the safety database. The service module may evaluate if the train is in proximity to a station. If a station is recognized the waiting passengers may be counted and entered into the service database. In some embodiments, engineering aspects such as track defects, tunnel defects and grade crossing operations are logged in an engineering database.

Safety Features (Safety Module)

Obstruction Distance and Speed Detection (Objects in Track Area)

Figure 3:
FIG. 3 depicts a simulated obstruction distance and speed detection from the vehicle mounted imaging pipeline in accordance with one or more embodiments of the present disclosure.

In some embodiments, the moving vehicle image pipeline may use the custom trained machine learning inferencing model to detect and measure distance and relative speed of obstructions in the area in front of the train through a combination of techniques. For each frame of the video the track area is recognized by the YOLO v5 algorithm. In some embodiments, a training dataset of forward-facing video may be used to train the algorithm to detect a track area and annotate each image with a bounding box around the track area. For example, training has been performed using 10,000 images of track from a forward-facing view to achieve an accurate detection of the track area. The track bounding boxes are combined with a line fitting or curve fitting algorithm that provides a trapezoid or sector region of interest. The distance ahead of the train that can be recognized is limited by the resolution of the camera. FIG. 3 shows a simulated example of an obstacle or obstruction detection with speed detection.

In some embodiments, a machine learning model may be employed to estimate the distance (e.g. in terms of feet) between the train (with forward facing cameras) and another train (or other objects) on the same rail line, as well as respective speed of the train and the other train. Based on the distance and their relative speeds, the recommendation engine may develop a risk-based warning or automated braking system. Train braking curve (depending on train weight, speed, weather, coefficient of friction between wheel and rail, track geometry and other factors) can be developed and the optimal collision avoidance action can be taken (e.g. early warning, slow down or stop) to ensure safety.

In some embodiments, where a recognized object is detected within the track area (person, car, motorcycle etc.) an alert may be raised with a distance measurement to the object. This distance may be evaluated using a two-frame motion estimation based on polynomial expansion. In some embodiments, the two-frame motion estimation may be configured and/or trained using annotated images in a similar field of view to establish a transformation of a relative distance based on the algorithm and real-world distances. Additionally, an alert is raised if the recognition of the track is broken or shortens suddenly.

In some embodiments, the recommendation engine may use the moving vehicle image pipeline to provide train operators warnings about potential hazards in the right of way. In some embodiments, this can give them the opportunity to apply brakes or sound the locomotives horn as warning. Additionally, the locations of the defects can be tagged with GPS coordinates and relayed to responsible parties for clearing obstacle or obstructions.

Trespassing detection with Geospatial and Time Series Analytics (Trespasser Detected)

Figure 4:
FIG. 4 depicts shows a simulated example of track detection with a detection of a person within the track area from the vehicle mounted imaging pipeline in accordance with one or more embodiments of the present disclosure.

In some embodiments, the moving vehicle image pipeline may detect trespassers within the railroads right of way through the forward-facing view. The YOLO algorithm may be trained on a custom annotated dataset combined with the Common Objects in Context (COCO) dataset or other annotated datasets to detect people and vehicles. If these objects are recognized in the track area or the immediately adjacent buffer zone in the forward-facing view a video clip and data entry may be generated in a trespassing database. FIG. 4 shows a simulated example of a detection of a person within the track area.

In some embodiments, this information can then be mapped on a GIS map to identify trespassing hotspots and formulate education, engineering, and enforcement solutions. Additionally, these events can be plotted on a time series to provide similar insights into mitigation strategies.

In some embodiments, the distance measurement is obtained in three steps by calculating the dense optical flow (f) using the Gunner Farneback's algorithm. First, the rate of change (r) of the area of the bounding boxes is calculated between two consecutive frames. For example, if the i-th frame area of the bounding box is Ai, then r=Ai/Ai-1. Next a weighted summation off and r are calculated and designated as the relative distance. Finally, a quadratic function transforms the relative distances to absolute distances. The constants in this quadratic formula may be obtained from manually annotated images of objects and their respective distances. This three step process may be repeated for every frame and the absolute distances are displayed.

Figure 5:
FIG. 5 depicts an example of curved track detection from the vehicle mounted imaging pipeline in accordance with one or more embodiments of the present disclosure.

In some embodiments, the safety module may detect the track area. This area is acquired in two steps in the software. The first step is the recognition of the track area through inferences made by the YOLOv5 algorithm. In some embodiments, using the annotation of training images, such as approximately 10,000 pre-annotated images, of track from archival forward facing video, a YOLOv5 weights file may be produced for inferencing and detection. The bounding boxes drawn in these images are combined using either line fitting or curve fitting solver. The resultant lines are joined into a trapezoid and are defined as the region of interest. In some embodiments, the YOLOv5 model using the weights file may detect both straight and curved track. FIG. 5 depicts an example of curved track detection using an illustrative model.

Service Features (Service Module)

Passenger Counts at Stops and Stations (Passengers on Platform)

Figure 6:
FIG. 6 depicts an example of passengers counted on platform from the vehicle mounted imaging pipeline in accordance with one or more embodiments of the present disclosure.

In some embodiments, the detection model and the service module may detect and count the number of people on train platforms. In some embodiments, people are recognized by the YOLO inferencing algorithm that has been trained on a custom annotated dataset combined with the COCO dataset. When a platform is encountered and recognized by the system the waiting passengers are tabulated and logged in a database. This passenger information can be relayed to the governing transit authority to provide real time analytics on service levels and demand. This passenger information can be mapped over time and provide analytics and forecasting to improve service. FIG. 6 depicts an example detection and counting of passengers on a platform. In some embodiments, historical data may be gathered and used to predict passenger counts by day, time and location. A variety of methodologies can be implemented on the historical dataset created by this tool ranging from statistical methods such as the ARIMA or machine learning methods such as time series recurrent neural networks.

Engineering Features (Engineering Module)

Rail Track Defect Detection (Track Defects)

Figure 7A:
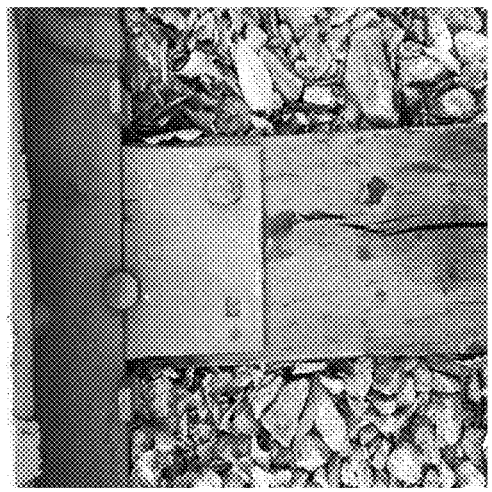
FIG. 7A, FIG. 7B and FIG. 7C depict an example of track component training data images for the vehicle mounted imaging pipeline in accordance with one or more embodiments of the present disclosure.
Figure 7B:
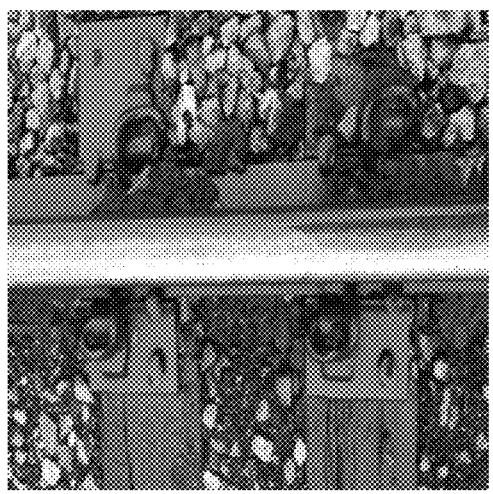
Figure 7C:
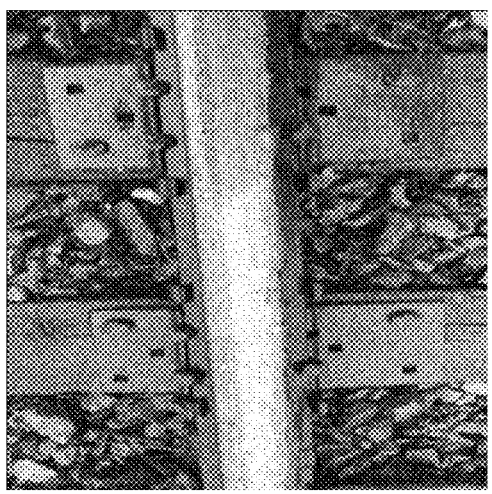

In some embodiments, the engineering module may recognize defects in the track area such as surface defects, tie conditions, missing fasteners and significant geometry changes (e.g. track buckling, washouts etc.), missing spikes, missing clips and broken joint bars etc. In some embodiments, a database of annotated images of track components and defects may be collected and used to generate convolutional neural network weights. These weights may then be utilized by a suitable machine learning model, such as a neural network (e.g., YOLOv5 inferencing or other neural network for inferencing or any combination thereof) to detect and classify track components and defects. FIG. 7A, FIG. 7B and FIG. 7C show examples of publicly available images used in this training dataset. This is possible when the algorithm is coupled to a downward facing, high-resolution, high-framerate camera. In some embodiments, when a defect is recognized it can be coupled to a GPS location which can then be relayed to maintenance personnel for remediation.

Figure 8:
FIG. 8 depicts shows an example of a rail kink in a forward facing view from the vehicle mounted imaging pipeline in accordance with one or more embodiments of the present disclosure.

Additionally, in some embodiments, in the forward-facing view rail track defects can be detected through evaluation the detected track area. In some embodiments, defects such as rail kinks can be detected by this algorithm, providing warning to the train drivers and GPS tagging for maintenance. FIG. 8 shows an example of a rail kink in a forward facing view. In some embodiments, defect data may be aggregated in a database and predictions can be made through statistical or machine learning methods. For instance, the database may provide data to predict the location and time for a future rail break and therefore inform targeted preventive maintenance.

Tunnel Inspection (Tunnel Defects)

In some embodiments, the engineering module may recognize defects in tunnels such as concrete spalls. These defects are detected through YOLO inferencing using weights obtained by a custom annotated dataset consisting of concrete spalls. Only visible spalls can be detected in this manner. Once a spall is detected its location can be relayed to a defect database for remediation.

Railroad Crossing Inspection (Grade Crossing Operation)

In some embodiments, the engineering module may recognize and understand the operation of grade crossings which includes the flashing lights and gate arms. These components are detected through YOLO inferencing using weights obtained by a custom annotated dataset consisting of gate arms and signal lights. In some embodiments, where the grade crossing does not function (lights are not flashing and/or arms are not deployed), then a defect is tagged for remediation by maintenance personnel.

Recommendation Engine

Prediction on infrastructure condition a. Vision-based infrastructure monitoring data (historical data)
b. Time stamp
c. Weather/season/temperature data
d. Other types of (nondestructive) inspection data or manual inspection data (e.g. track geometry inspection, ultrasonic rail flaw testing, ballast condition inspection, visual inspection data)
e. Maintenance activity data (e.g. replacement, repair, rehabilitation, cleaning)
f. Traffic data (e.g. number of trains, traffic tonnage, axle load, wheel impact load and others)
g. Infrastructure design, layout and geometric information (e.g. rail age, rail weight, curvature, grade, presence of special trackwork, and others)

In some embodiments, based on the passenger count information from the service module, a machine learning model of the recommendation engine can count the number of people on the platform. In this way, passenger flow (e.g., demand) may be monitored by station and by time. Using this type of data, ridership distribution may be analyzed and used with historical data to predict the future passenger count. In some embodiments, the recommendation engine may ingest the passenger information, including real-time and historical passenger information, time stamps for the passenger information, weather and season data, census data at the location of the passenger information, socio-demographic and economic factors at the location and time of the passenger information (e.g., occupation distribution, economic status, etc.), location-centric information (the location of the station in relation to other business or recreational activities, etc.) among other data as inputs to a passenger flow or demand prediction model. In some embodiments, the weather and season data, census data at the location of the passenger information, socio-demographic and economic factors at the location and time of the passenger information (e.g., occupation distribution, economic status, etc.), location-centric information (the location of the station in relation to other business or recreational activities, etc.) among other data may be accessed or obtained from third-party services, such as, e.g., weather services, census and demographic sources, etc.

In some embodiments, the recommendation engine may perform infrastructure monitoring. Currently, the infrastructure monitoring is either manual or based on specialized vehicles (aka. track inspection vehicle that occupies track time). Having the sensors mounted on the train may provide continuous infrastructure inspection with no interruption to revenue service. Thus, in some embodiments, the recommendation engine may employ the data from the engineering module for infrastructure health monitoring, which may include track infrastructure, track geometry, grade crossing, tunnel, rail signal, railroad switch position and condition, and others. In some embodiments, the recommendation engine may access or obtain, e.g., from third-party services, additional data that affect railway infrastructure defects and deterioration. For example, the recommendation engine may receive, e.g., weather/season/temperature data, other types of (nondestructive) inspection data or manual inspection data (e.g. track geometry inspection, ultrasonic rail flaw testing, ballast condition inspection, visual inspection data), maintenance activity data (e.g. replacement, repair, rehabilitation, cleaning), traffic data (e.g. number of trains, traffic tonnage, axle load, wheel impact load and others), or any other data or any combination thereof.

Infrastructure design, layout and geometric information (e.g. rail age, rail weight, curvature, grade, presence of special trackwork, and others)

Based on the repeating inspection results, the change of track condition (or relevant infrastructure quality index) can be understood. This understanding may be employed by the recommendation engine to predict future infrastructure condition, based on prior inspection results, traffic, weather, maintenance, operation and other types of data.

In some embodiments, data from the safety module may be provided to the recommendation engine for obstacle, obstruction and trespassing detection and collision avoidance. Based on the distance to obstacles and trespassers and relative speeds, the recommendation engine may produce a risk-based warning or automated braking system. Train braking curve (depending on train length, train weight, speed, weather, coefficient of friction between wheel and rail, track geometry and other factors) can be developed and the optimal collision avoidance action can be taken (e.g. early warning, slow down or stop) to ensure safety.

Example 2—Fixed Location Imagery Collection and Analysis

Figure 9:
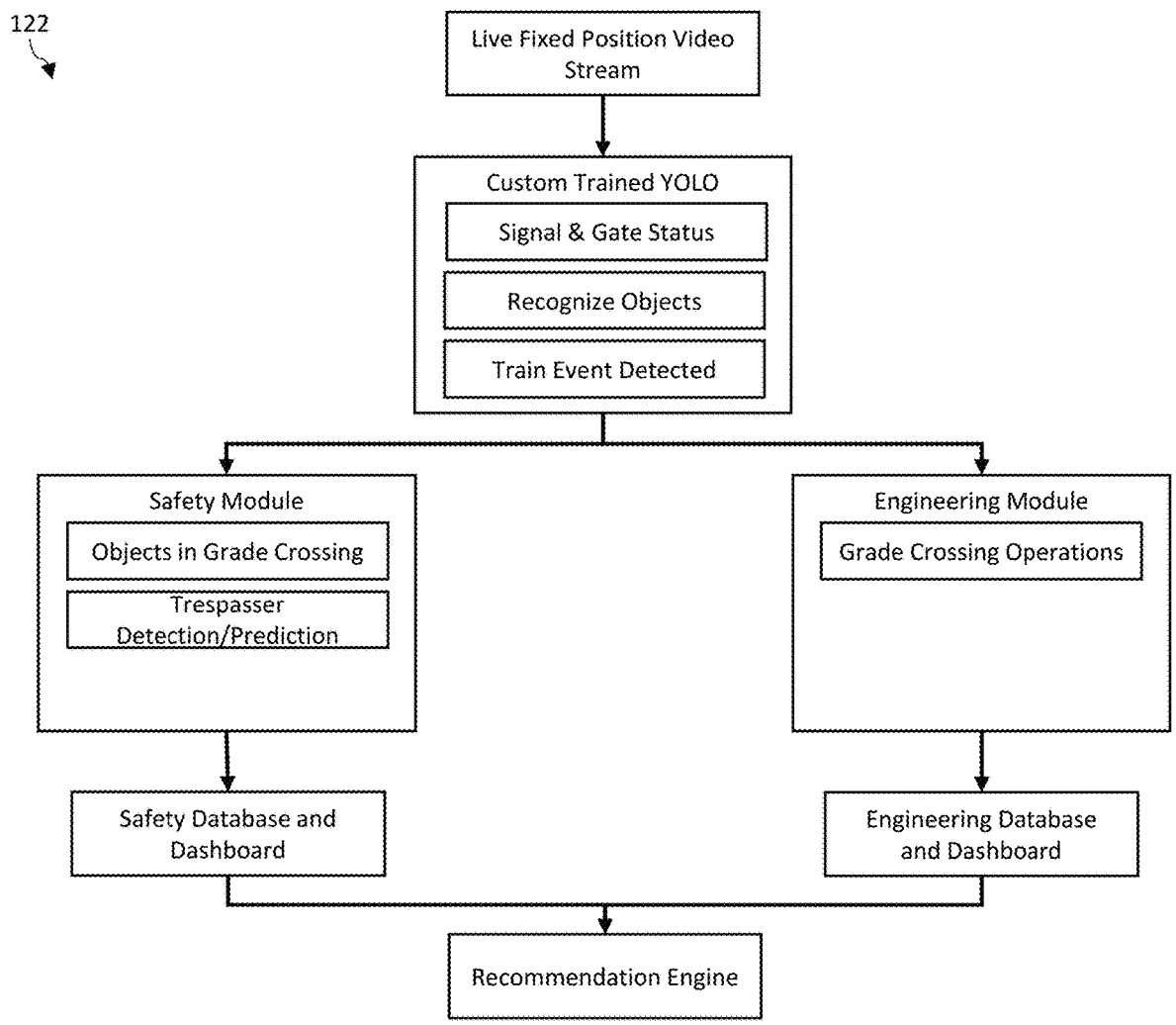
FIG. 9 depicts a block diagram of a fixed grade crossing imaging pipeline of another illustrative intelligent railway analytics platform for predictive monitoring and assessment of railway conditions in accordance with one or more embodiments of the present disclosure.

Referring to FIG. 9 a fixed location image pipeline for fixed location railway monitoring, assessment and prediction is depicted according to one or more embodiments of the present disclosure.

In some embodiments, the fixed location image pipeline may be configured to detect, analyze, and propose mitigation strategies for trespassing in the railroad industry. In some embodiments, the fixed location image pipeline may analyze live video streams in a variety of formats and recognize a variety of trespassers in the cameras field of view. Recognized objects may then be recorded into a database which is made available to users through a user interface. In some embodiments, visualizations may be generated from the data to provide insights and assist in decision making. The data may be integrated into a recommendation engine to suggest recommended mitigation actions.

In some embodiments, the fixed location image pipeline may include two major components dubbed the front-end and the back end. The front end is the client interface which displays database records, live video streams and options for users to download and view data. The back end hosts the various modules, database and AI which populates the database with desired information.

In some embodiments, the client may be developed using a suitable front end programming language, such as a front-end web programming language, e.g., the ReactJS framework in conjunction with Bootstrap for user interface customizations. In some embodiments, the data generated by the detection system may be stored in a suitable database, such as, e.g., a MongoDB database, and transmitted to the client via a suitable messaging framework such as, e.g., a KAFKA framework.

Image Processing

In some embodiments, the fixed location image pipeline may include an AI detection system that utilizes a combination of different computer vision and artificial intelligence techniques to detect trespassers in the camera's field of view. In some embodiments, to initialize the system a user is prompted to create a location by providing a live stream or archival video, identify whether the location is a right-of-way or a grade crossing, draw the region of interest where trespassers can be identified and select the visible signal light, if the video is a grade crossing. The system may then utilize an artificial intelligence algorithm to identify objects of interest (car, person, bicycle, train etc.) and track the objects of interest from frame to frame. The system may also check for the activation of the grade crossing and may log trespasses when they are detected. In some embodiments, the fixed location image pipeline may augment the objects of interest and activity of grade crossings with external data, such as, e.g., weather and temperature, population density, proximity to places of interest (e.g., schools, restaurants, stores, shopping malls, etc.) using interfaces with third-party services.

In some embodiments, the fixed location image pipeline may include several techniques to identify, track and analyze objects from a fixed location image sensor. In some embodiments, a safety module may perform object detection using a suitable machine learning inferencing model, such as a neural network (e.g., YOLOv5) trained to detect objects with a suitable training dataset, such as, e.g., common objects in context (COCO). In some embodiments, the detect objects may be tracked by the safety module using a suitable tracking model, such as, e.g., simple real-time online tracking (SORT) algorithms adapted to have architectures and parameters for tracking objects and people. In some embodiments, grade crossing operations, including signal status detection may be performed by the engineering module using a radius luminance comparison.

Signal Status Detection

In some embodiments, the flashing of a warning signal at a grade crossing warns drivers and pedestrians of an approaching train. Once this light begins flashing, roadway users are not permitted to enter the crossing. The engineering module may determine the status of the signal and record trespassers that enter the region of interest. Developing a universal methodology to determine the signal status posed a significant challenge due to the variety of video resolutions, angle of the signal light, weather, false detections caused by vehicle headlights etc. In some embodiments, detection models may include, e.g., Mapping the Absolute RGB Pixel Value, Evaluating the 1st Derivative of the Luminance, Evaluating the 2nd Derivative of the Luminance, Comparing the Fourier, Open CV Based Background Subtraction, Calculating the Sum of the Pixel Values, Convolutional Neural Network Detection, or other possible models. However, in some embodiments, a radius luminance comparison may overcome obstacles such as, e.g., variations in environmental factors, glare caused by headlights and other factors that would cause false positives or missed detections.

In some embodiments, the radius luminance comparison model may include at least three steps:
1. User selects the visible signal light;
2. User establishes and inner and outer radius;
3. System detects and display's signal status:
   a. For each frame, the inner and outer radius median luminance value is compared,
   b. This difference is spliced to the end of an array comprised of these values in the past 2 seconds of video frames,
   c. If the number of values exceeding an established threshold exceeds a proportion of these frames, a positive signal detection is reported, and
   d. When this proportion drops below a threshold, the deactivation of the signal is reported.

Figure 10:
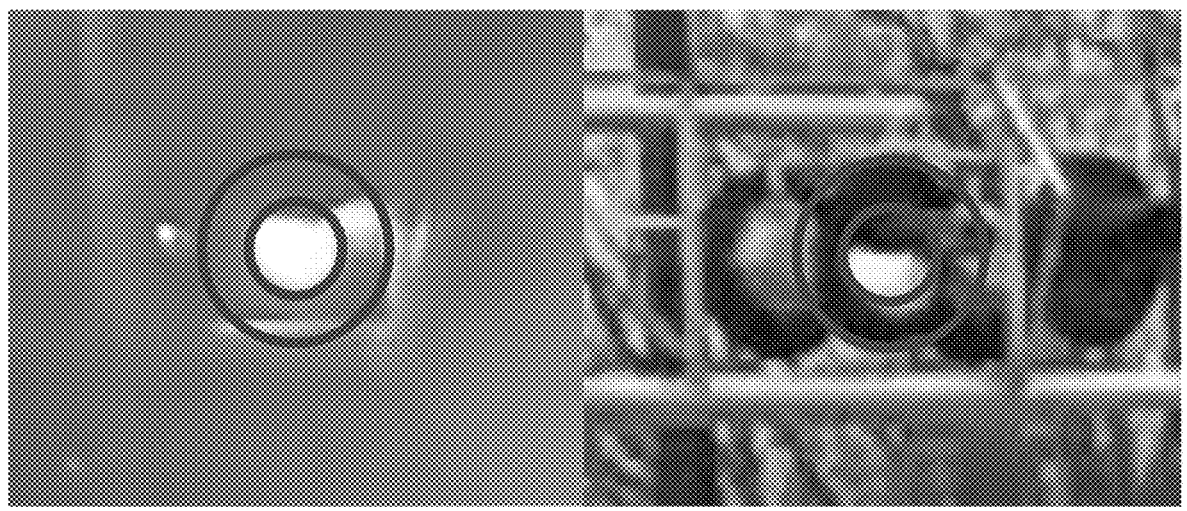
FIG. 10 depicts an example of inner and outer radius for signals during night (left) and day (right) for detection by the fixed grade crossing imaging pipeline in accordance with one or more embodiments of the present disclosure.

FIG. 10 illustrates an example detection of a grade crossing signal, including providing an annotation for an inner and outer radius for signals during night (left) and day (right). This methodology is more invariant to environmental factors, glare caused by headlights and other factors that would cause false positives or missed detections.

Browser Friendly Video Encoding

In some embodiments, the fixed location image pipeline may include an adaptation of the OpenCV library to provide video in a web friendly format. The OpenCV library may be used to perform various functions in the tool, one of which was to generate annotated video clips displaying the bounding boxes of detected objects. OpenCV's format does not allow for these videos to be displayed in most browsers, due to the limited encoding formats available. Accordingly, in some embodiments, the fixed location image pipeline may include a methodology to utilize alternative encoding methods through the open source FFMEG tool to render these clips so any web browser can view them using custom parameters.

Object Detection

Figure 11:
FIG. 11 depicts an example of a right-of-way trespassing detection by the fixed grade crossing imaging pipeline in accordance with one or more embodiments of the present disclosure.
Figure 12:
FIG. 12 depicts an example of a grade-crossing detected trespassing detection by the fixed grade crossing imaging pipeline in accordance with one or more embodiments of the present disclosure.

In some embodiments, the fixed location image pipeline may detect objects using the You-only-look-once Convolutional Neural Network version 5 (YOLOv5). This CNN may be retrained on a library of custom annotated images in this research to accurately classify trespassers and legal occupiers of the grade crossings and right of ways. The YOLOv5 code repository provides pre-trained weights and over 50 classes of objects that can be detected. In our research we reduced the number of classes to 7 (car, bus, truck, person, bicycle, motorcycle, train). In some embodiments, YOLOv5 may be retrained using the custom annotated images of trains to improve the detection model. The remainder of the classes may be trained using the common objects in context (COCO) dataset. FIG. 11 and FIG. 12 show detected trespassers in a right of way and a grade crossing displayed on the web, including a right-of-way trespassing example in FIG. 11 and a grade crossing trespassing in FIG. 12.

Object Tracking

In some embodiments, objects may be tracked from frame to frame using the Simple Realtime Online Tracking (SORT) framework. In some embodiments, to ensure that SORT's tracking was accurate experimentation and testing may be employed to establish the correct parameters for this algorithm. The parameter modification and integration with other elements of the fixed location image pipeline, the detection accuracy may be improved to reduce errors due to mutual occlusion (tracked objects passing in front of each other) and foreground occlusion (tracked objects passing behind obstacles).

Safety Module Analytics

In some embodiments, the safety module may aggregate and generate trespassing analytics. The data generated by the system is accumulated in a trespassing database. Further data analyses are automatically conducted to process the raw data into visualizations which can assist railroads, transit providers and local/federal agencies in developing mitigation strategies. The safety module may provide time-series heatmaps of trespass occurrence and predictions of future trespasses using current data, as illustrated in FIG. 13 and FIG. 14.

Time Series Analytics

In some embodiments, as the database grows, the distribution of trespasses in time becomes apparent. By mapping the relative occurrence of trespasses over a day, week, month, or year can provide insights into effective mitigation strategies. FIG. 13 shows an example heatmap of days of the week and hours of the day highlighting the days that have the highest observed trespasses. This heatmap enables transit agencies to develop effective mitigation strategies. For example, using the below heatmap, a large proportion of trespasses could be mitigated by assigning a police officer to the crossing at the hours with the most trespasses. Ascertaining this insight was prohibitively expensive before the advent of this tool and database due to the high cost labor for manual video reviewing.

Additionally, in some embodiments, the data can be displayed according to the trespasser categories acquired through the system. This data gives insight into the type of trespasser that is performing a risky crossing and may inform different mitigation strategies. For instance, if the types of trespassers at a crossing were found to be busses, an education campaign with the bus companies may be an effective solution. The higher resolution data on trespassing allows for more efficient allocation of limited mitigation budgets.

Grade Crossing Predictions

In some embodiments, using the time-series analytics, machine learning models may be trained to forecast grade crossing obstacles and/or obstructions, and a time of occurrence thereof based on historical data and location. In some embodiments, external data such as weather may be incorporated as an input to the machine learning models to account for external factors.

Trespass Prediction

In some embodiments, the safety module may overcome limitations such as limited observations and engineering expertise and high cost of labor for monitoring and recording data by gathering large amounts of trespassing data. Once enough time series data has been accumulated, a prediction into future trespassing can be made using a suitable forecasting module, such as, e.g., an ARIMA model for forecasting the occurrence of trespasses. Predictions require at least a specified ratio (e.g. 7:1 or others) of historical data to prediction window. For example, to predict one day of trespassing, you may provide 7 days of trespassing to the model. The large amounts of data gathered by this system may allow for the development of more accurate prediction models, which may inform more effective mitigation strategies. In some embodiments, external data such as weather, population density, season data, temperature data, census data, socio-demographic and economic factors at the location (e.g. occupation distribution, economic status), location-centric information (the location of the station in relation to other business or recreational activities), infrastructure data (e.g. protection device, signal type, number of tracks, number of roadway lanes, angle of intersection), or any other external data or any combination thereof may be incorporated as an input to the machine learning models to account for external factors.

Engineering Module Analytics

Grade Crossing Operations

In some embodiments, the engineering module may implement an algorithm to detect red signal status (activated or de-activated). Therefore, signal activation time may be used to calculate the time that the grade crossing is protected for train to pass by (during which, no people or vehicles should cross the location). This information is of great importance to know the time duration that a grade crossing is "blocked" due to train presence. This information can be sent to emergency responders, special duty vehicles, the general public for routing decisions.

In some embodiments, based on train speed estimation, the engineering module may infer the time when the next few grade crossings on the same rail lines could be blocked, even if they do not have any cameras there. For example, grade crossing A is blocked (train passes) for 5 minutes at 9 AM, grade crossing B is away from A on the same line (distance is 1 mile based on location on Google Maps on other maps). If train speed is estimated to be 40 miles per hour (MPH) the engineering module may predicted that 1.5 minutes later, grade crossing B would be blocked.

In some embodiments, the engineering module may perform automated cross-check (train detection, signal detection and gate detection). In sequence, after red signal is activated, gate starts to be lower down, and then train comes. Similarly, after train leaves, gate is up, and then red signal is off.

In some embodiments, by calibrating the engineering module according to this logic and the time gap between these related events, algorithm accuracy may be improved. For example, one big challenge is the detection of red signal activation (weather condition may cause false detection). However, before the data is presented to users, two other detections may also be performed (e.g. trains and gates) to cross-validate and clean the signal activation data. Similarly, any two types of detection may be employed to validate the third one.

Recommendation Engine

In some embodiments, the recommendation engine may utilize the analyses from the safety module and the engineering module to generated recommendations of mitigation strategies. In some embodiments, the recommendation engine may be configured to review trends in data and provide recommended actions for the responsible authority to mitigate trespassing. This may be accomplished by cataloging all engineering and enforcement trespassing mitigation strategies in the industry, crossing elimination, fencing, dynamic envelopes etc. Parameters to trigger specific recommendations may be established for automated recommendation generation.

For example, dynamic envelopes have been shown to be an effective strategy to prevent vehicles stopping in the middle of a crossing. A vehicle stopping in the crossing is dangerous due the possibility of a vehicle becoming disabled or trapped between two other vehicles when the crossing activates. If this event was witnessed by the fixed location image processing pipeline, the recommendation engine may propose dynamic envelopes, highlighting the frequency of the events and the cost/benefit ratio of the suggested solution. For another example, if the recommendation engine determines that most trespasses occur by pedestrians crossing while the gates are fully deployed, gate skirts may be an effective solution.

This connection between big video data, automatic data analytics and mitigation strategies may enable the reduction of trespassing in the railroad industry. In some embodiments, using the trespass data, time of trespass occurrence, e.g., from an image time stamp, may be used to formulate an understanding of its temporal proximity to train presence (it is the time difference between trespassing occurrence and train presence. For example, a trespassing may occur just 5 seconds prior to train arrival at the same location). In this way, so-called "near misses" (which means that the above-mentioned time difference is smaller than a specified threshold) may be recognized and modelled. In some embodiments, a distribution of the temporal proximity may be generated (for example, we can estimate the percentage of trespassing events occurred within 5 seconds of train presence), the time difference between trespassing occurrence and signal status and gate position may be calculated, as well as other analyses to facilitate an understanding of whether the safety warning time is sufficient and how it should be optimally modified. In some embodiments, the recommendation engine may analyze the characteristics of trespassing occurrence, e.g. the percentage of trespassing before train arrives versus trespassing occurrence after train departures, while the red signal is still on.

In some embodiments, the recommendation engine may then model a correlation of the frequency of trespassing events with time-dependent, and location-specific characteristics. Time-dependent factors could include season, weather, month, week, day, hour etc. The location-specific characteristics could include infrastructure geometry (e.g. number of tracks, number of lanes on roadways and other grade crossing inventory data that is publicly available, as well as roadway traffic and railway traffic both of which can be detected via the AI included in this invention, local population density, proximity to places of interest such as restaurant, schools and others). Based on these time-dependent factors and location-specific factors, the recommendation engine may predict future trespassing occurrence by time and location using statistical or machine learning models (there are a variety of modeling options, for example, time series modeling). As an example, based on the historical trespassing detection data (e.g. in the past 7 days for each hour), the recommendation engine may predict trespassing occurrence by hour in the following day. Also, in other locations without existing cameras, the recommendation engine may use the predictive model to estimate the occurrence of trespassing based on known factors.

In some embodiments, the recommendation engine may leverage the detection of grade crossing blockage time (time difference between red signal is on and off). For example, if a red signal is on (the grade crossing is active) at 9:00 AM, and is off (deactivated) at 9:05 AM, the obstacle or obstruction time is 5 minutes. The recommendation engine may generate a distribution of the obstacle or obstruction time by time and location. Obstacle or obstruction time may be cause roadway traffic-related delays, especially for special-duty vehicles such as police car, ambulance, emergency responders, to optimize their routing decision.

In some embodiments, for the same location, the recommendation engine may provide real-time grade crossing blockage time to roadway users (wirelessly to their phone, car or other receiving devices) so they may optimize the routing decision to avoid blocked grade crossing.

In some embodiments, the recommendation engine may use historical obstacle or obstruction data to predict the obstacle or obstruction time in advance and send the predictive information to roadway users. For example, we can use the obstacle or obstruction time day (by day of week and hour) to predict the future obstacle or obstruction time by hour for a specific location in the next few hours or days.

In some embodiments, the recommendation engine may use the obstacle or obstruction time at one grade crossing to infer the consequent obstacle or obstruction in other grade crossing locations on the same rail line. For example, grade crossing A is blocked for 15 minutes by a long freight train, between 9 and 9:05 AM. Using geographical information, the recommendation engine may determine that the next grade crossing in the downstream of the traffic is 0.5 mile away. The recommendation engine may can also estimate the moving speed of the train. In this way, the recommendation engine may use the distance divided by train speed to predict the time when the next grade crossing is blocked. Similarly, the recommendation engine may repeat this process to predict the obstacle or obstruction time in the next few grade crossings (e.g. the next 5 grade crossings in a row), and send location-centric, time-dependent obstacle or obstruction information to roadway users.

User Interface

Figure 15:
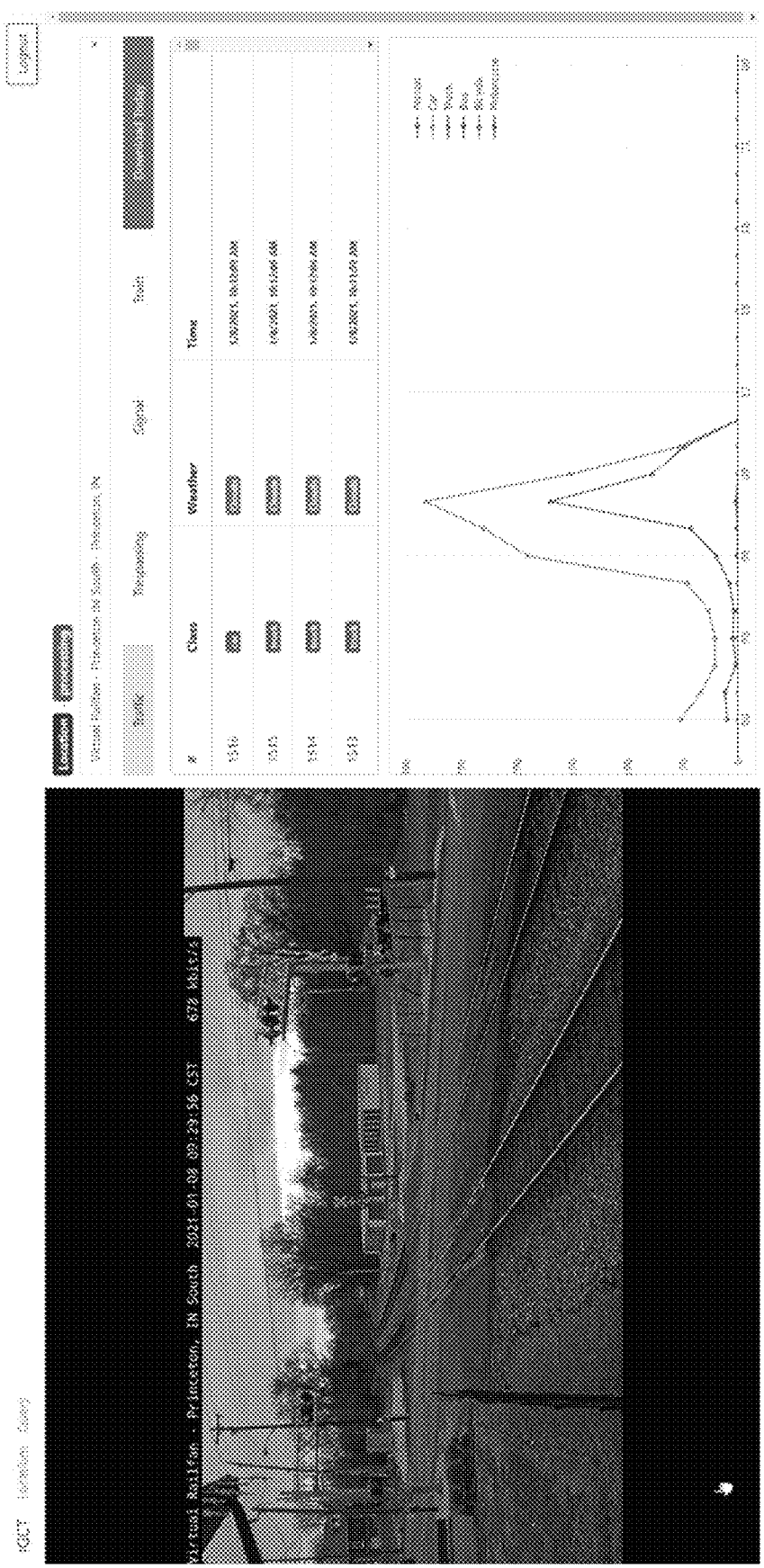
FIG. 15 depicts an example of a grade crossing traffic detection of a live stream grade crossing by the fixed grade crossing imaging pipeline in accordance with one or more embodiments of the present disclosure.
Figure 16:
FIG. 16 depicts an example of a grade crossing trespassing detection of one or more live streams by the fixed grade crossing imaging pipeline in accordance with one or more embodiments of the present disclosure.
Figure 17:
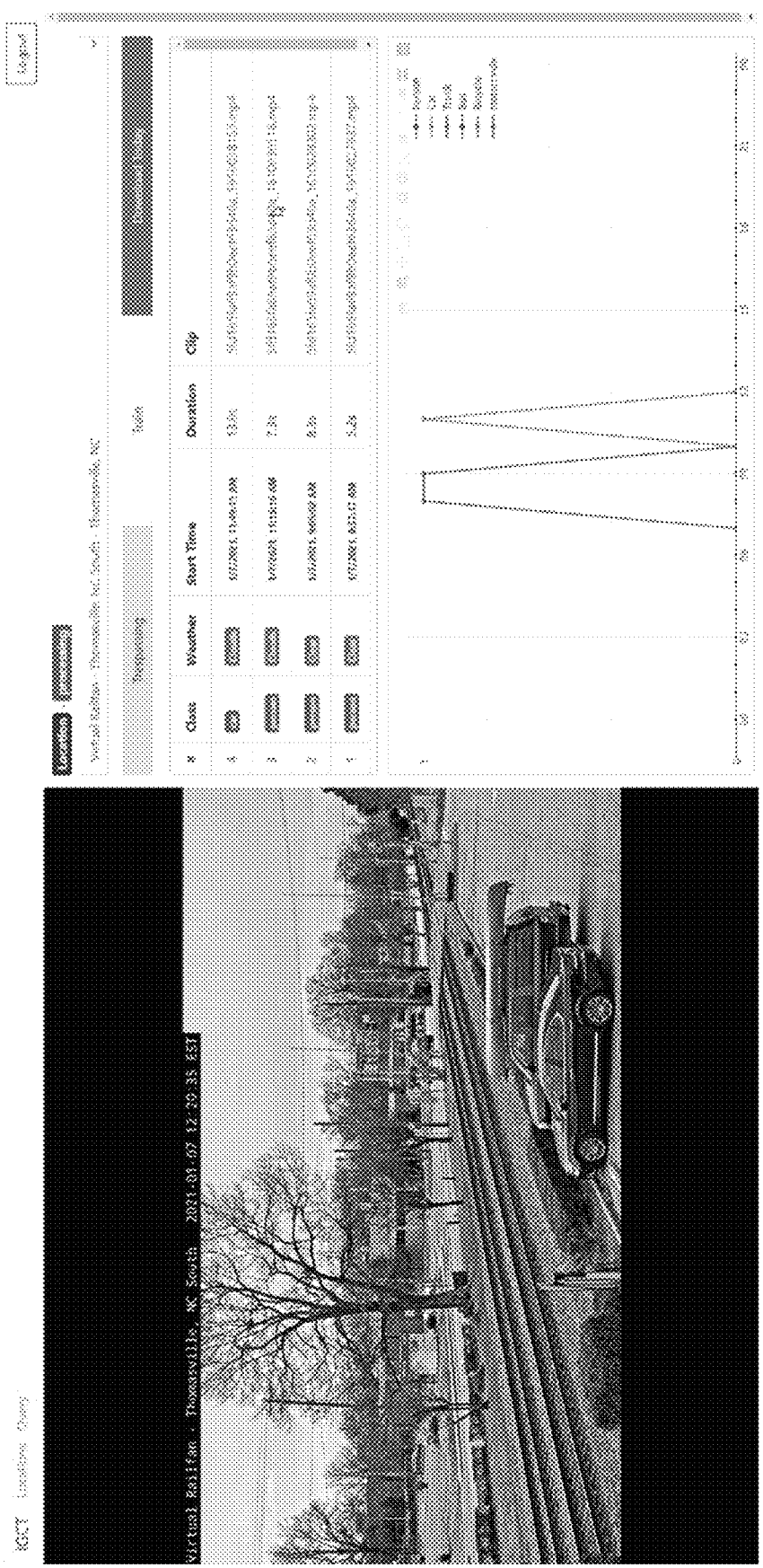
FIG. 17 depicts an example of a right-of-way trespassing detection of one or more live streams by the fixed grade crossing imaging pipeline in accordance with one or more embodiments of the present disclosure.

In some embodiments, analytics and recommendations may be stored in a database and presented to the user through a user interface. In some embodiments, there may be four modules which display real-time information to the users for livestreams; traffic, trespassing, signals and trains. FIG. 15 through FIG. 17 show example user interface outputs. FIG. 15 shows an example of the traffic module of a live stream grade crossing. FIG. 15 shows an example of grade crossing traffic detection module. FIG. 16 and FIG. 17 show examples of the trespassing module of two live streams. FIG. 16 shows an example of grade crossing trespassing detection module. FIG. 17 shows an example of right-of-way trespassing module.

Figure 18:
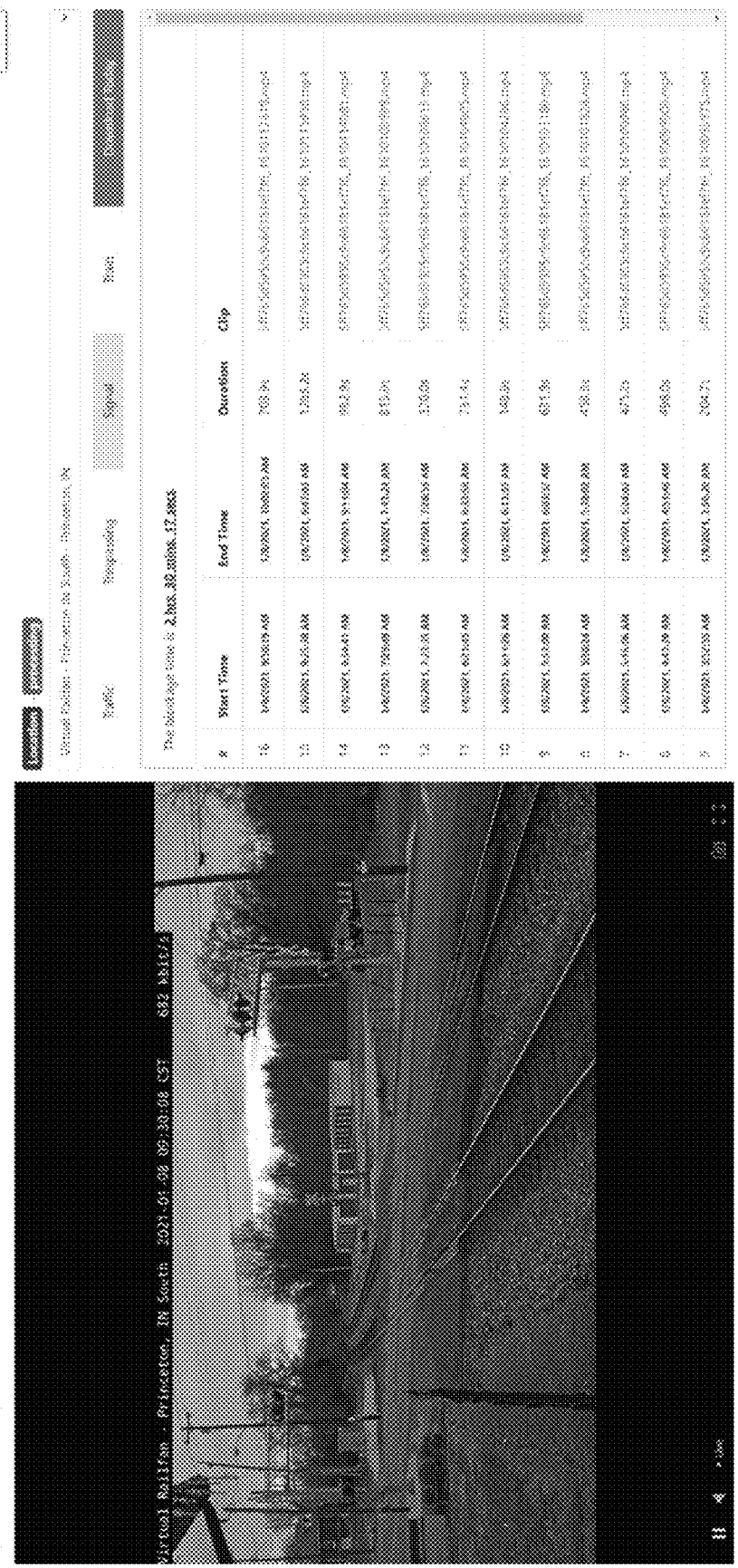
FIG. 18 depicts an example of signal events logged by a grade crossing signal event detection as represented by signal events tab of an example user interface from the fixed grade crossing imaging pipeline in accordance with one or more embodiments of the present disclosure.

In some embodiments, the signal events are logged based on the computer vision techniques described above. The area around the visible signal is selected by the user and an inner and outer radius luminosity levels are compared in each frame. These values are tracked from frame to frame and trigger signal events when they meet several criteria. These events are displayed on the signal events tab as shown in FIG. 18.

Figure 19:
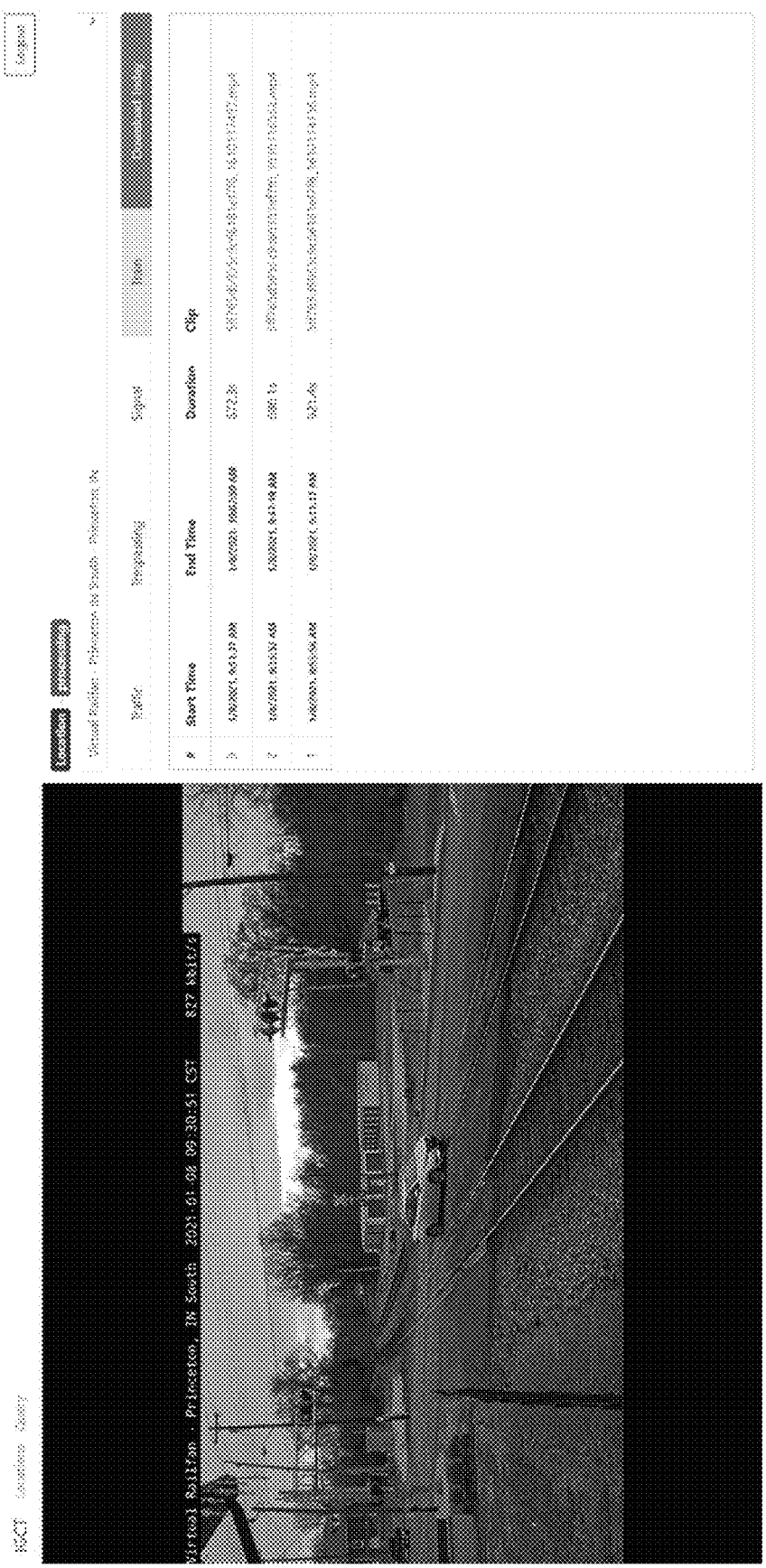
FIG. 19 depicts an example of train events logged by a grade crossing train event detection as represented by a train events tab of an example user interface from the fixed grade crossing imaging pipeline in accordance with one or more embodiments of the present disclosure.
Figure 20:
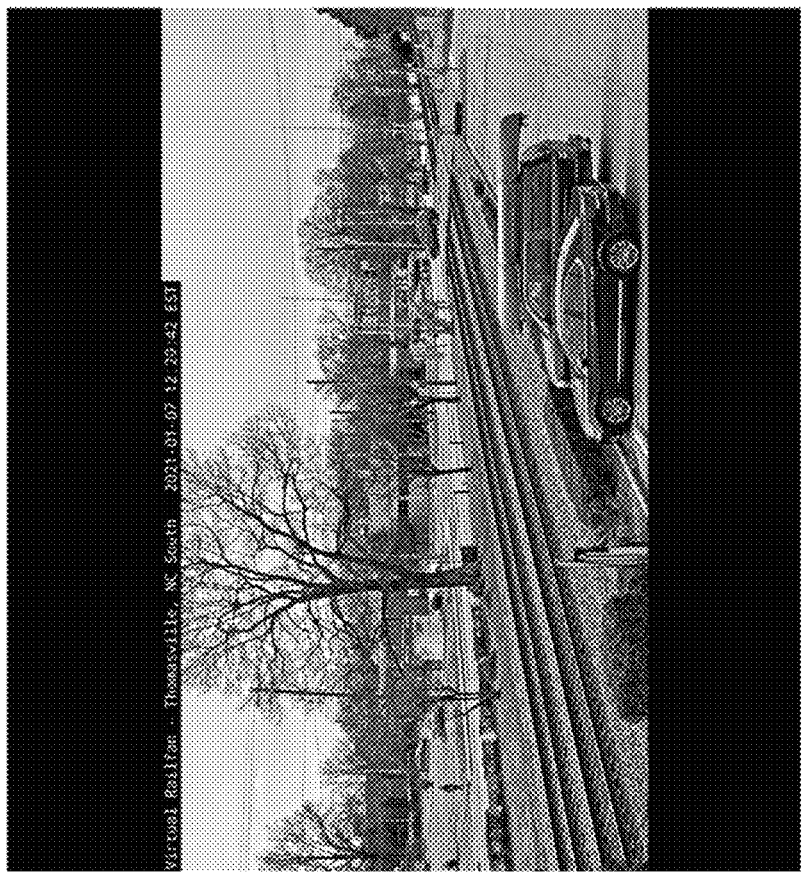
FIG. 20 depicts an example of train events logged by a right-of-way train detection as represented by a train events tab of an example user interface from the fixed grade crossing imaging pipeline in accordance with one or more embodiments of the present disclosure.

In some embodiments, the final module of the fixed location image pipeline operation is the train detection module. This module detects trains through the YOLOv5 framework using custom trained weights based on manually annotated images. FIG. 19 and FIG. 20 show examples of train events logged by the system, with FIG. 19 showing a grade crossing train event and FIG. showing a right-of-way train event.

Figure 21:
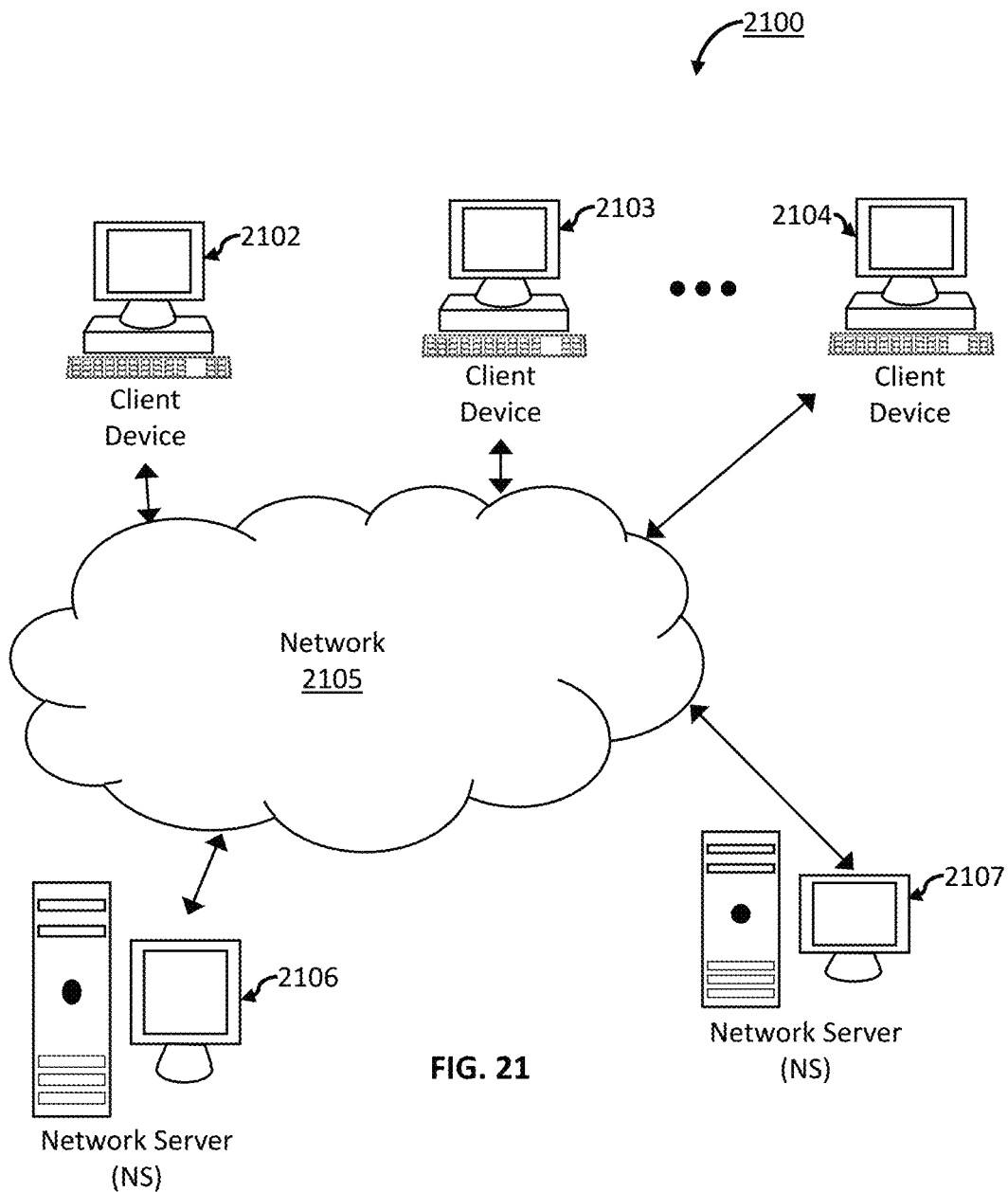
FIG. 21 depicts a block diagram of an exemplary intelligent railway analytics platform in accordance with one or more embodiments of the present disclosure.

FIG. 21 depicts a block diagram of an exemplary computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 2100 may be configured to manage a large number of members and concurrent transactions, as detailed herein. In some embodiments, the exemplary computer-based system and platform 2100 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 21, member computing device 2102, member computing device 2103 through member computing device 2104 (e.g., clients) of the exemplary computer-based system and platform 2100 may include virtually any computing device capable of receiving and sending a message over a network (e.g., cloud network), such as network 2105, to and from another computing device, such as servers 2106 and 2107, each other, and the like. In some embodiments, the member devices 2102-2104 may be personal computers, multiprocessor systems, microprocessor-based or programmable consumer electronics, network PCs, and the like. In some embodiments, one or more member devices within member devices 2102-2104 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 2102-2104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 2102-2104 may include may run one or more applications, such as Internet browsers, mobile applications, voice calls, video games, videoconferencing, and email, among others. In some embodiments, one or more member devices within member devices 2102-2104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 2102-2104 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 2102-2104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 2105 may provide network access, data transport and/or other services to any computing device coupled to it. In some embodiments, the exemplary network 2105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 2105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 2105 may include and implement, as an alternative or in conjunction with one or more of the above, a WiMAX architecture defined by the WiMAX forum. In some embodiments and, optionally, in combination of any embodiment described above or below, the exemplary network 2105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 2105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 2105 may also include mass storage, such as network attached storage (NAS), a storage area network (SAN), a content delivery network (CDN) or other forms of computer or machine readable media.

In some embodiments, the exemplary server 2106 or the exemplary server 2107 may be a web server (or a series of servers) running a network operating system, examples of which may include but are not limited to Apache on Linux or Microsoft IIS (Internet Information Services). In some embodiments, the exemplary server 2106 or the exemplary server 2107 may be used for and/or provide cloud and/or network computing. Although not shown in FIG. 21, in some embodiments, the exemplary server 2106 or the exemplary server 2107 may have connections to external systems like email, SMS messaging, text messaging, ad content providers, etc. Any of the features of the exemplary server 2106 may be also implemented in the exemplary server 2107 and vice versa.

In some embodiments, one or more of the exemplary servers 2106 and 2107 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 2101-2104.

In some embodiments and, optionally, in combination of any embodiment described above or below, for example, one or more exemplary computing member devices 2102-2104, the exemplary server 2106, and/or the exemplary server 2107 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 22:
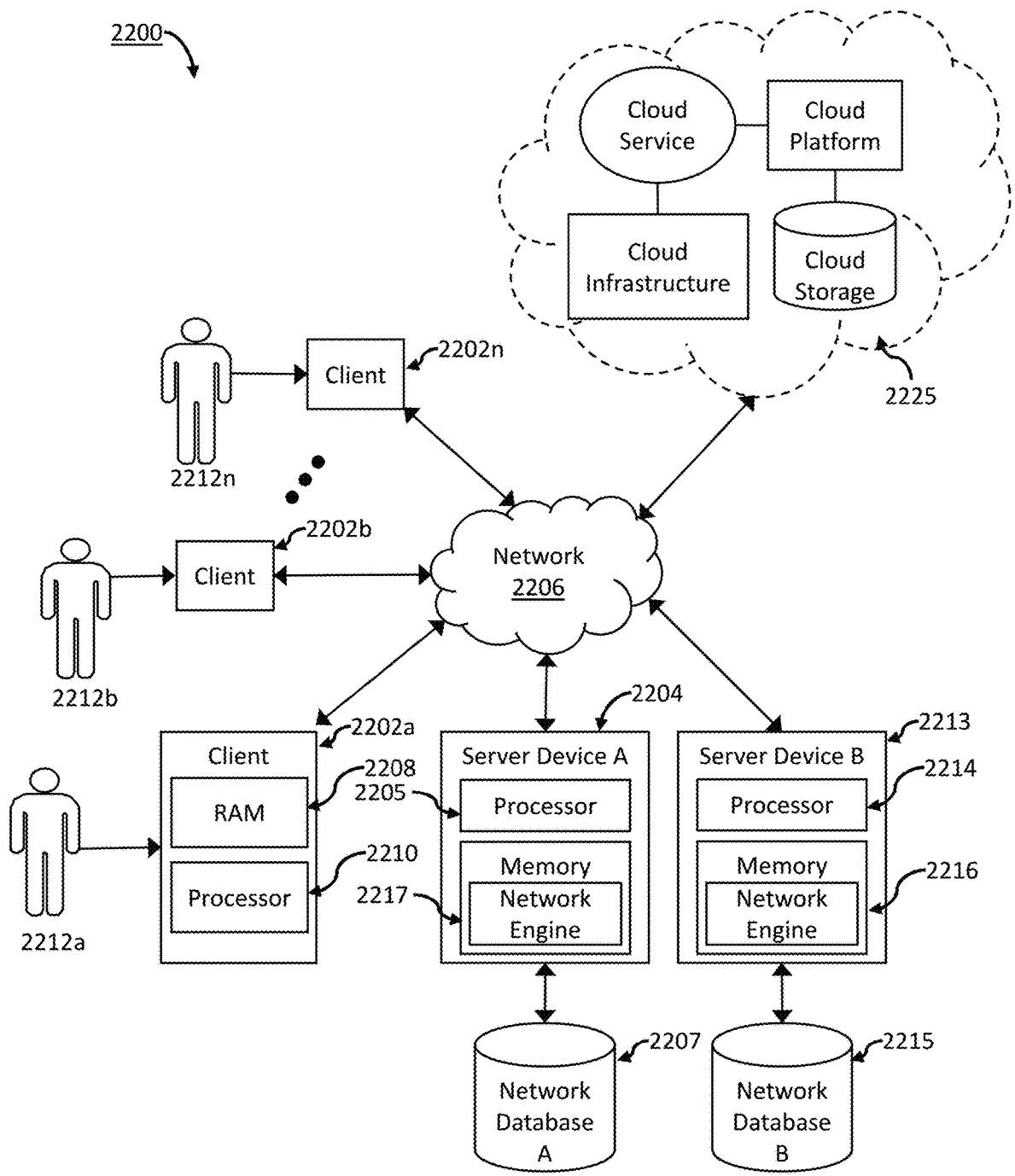
FIG. 22 depicts a block diagram of another exemplary intelligent railway analytics platform in accordance with one or more embodiments of the present disclosure.

FIG. 22 depicts a block diagram of another exemplary computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 2202a, 2202b thru 2202n shown each at least includes a computer-readable medium, such as a random-access memory (RAM) 2208 coupled to a processor 2210 or FLASH memory. In some embodiments, the processor 2210 may execute computer-executable program instructions stored in memory 2208. In some embodiments, the processor 2210 may include a microprocessor, an ASIC, and/or a state machine. In some embodiments, the processor 2210 may include, or may be in communication with, media, for example computer-readable media, which stores instructions that, when executed by the processor 2210, may cause the processor 2210 to perform one or more steps described herein. In some embodiments, examples of computer-readable media may include, but are not limited to, an electronic, optical, magnetic, or other storage or transmission device capable of providing a processor, such as the processor 2210 of client 2202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 2202a through 2202n may also comprise a number of external or internal devices such as a mouse, a CD-ROM, DVD, a physical or virtual keyboard, a display, or other input or output devices. In some embodiments, examples of member computing devices 2202a through 2202n (e.g., clients) may be any type of processor-based platforms that are connected to a network 2206 such as, without limitation, personal computers, digital assistants, personal digital assistants, smart phones, pagers, digital tablets, laptop computers, Internet appliances, and other processor-based devices. In some embodiments, member computing devices 2202a through 2202n may be specifically programmed with one or more application programs in accordance with one or more principles/methodologies detailed herein. In some embodiments, member computing devices 2202a through 2202n may operate on any operating system capable of supporting a browser or browser-enabled application, such as Microsoft™, Windows™, and/or Linux. In some embodiments, member computing devices 2202a through 2202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 2202a through 2202n, users, 2212a through 2202n, may communicate over the exemplary network 2206 with each other and/or with other systems and/or devices coupled to the network 2206. As shown in FIG. 22, exemplary server devices 2204 and 2213 may be also coupled to the network 2206. In some embodiments, one or more member computing devices 2202a through 2202n may be mobile clients.

In some embodiments, at least one database of exemplary databases 2207 and 2215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, My SQL, Postgre SQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 23:
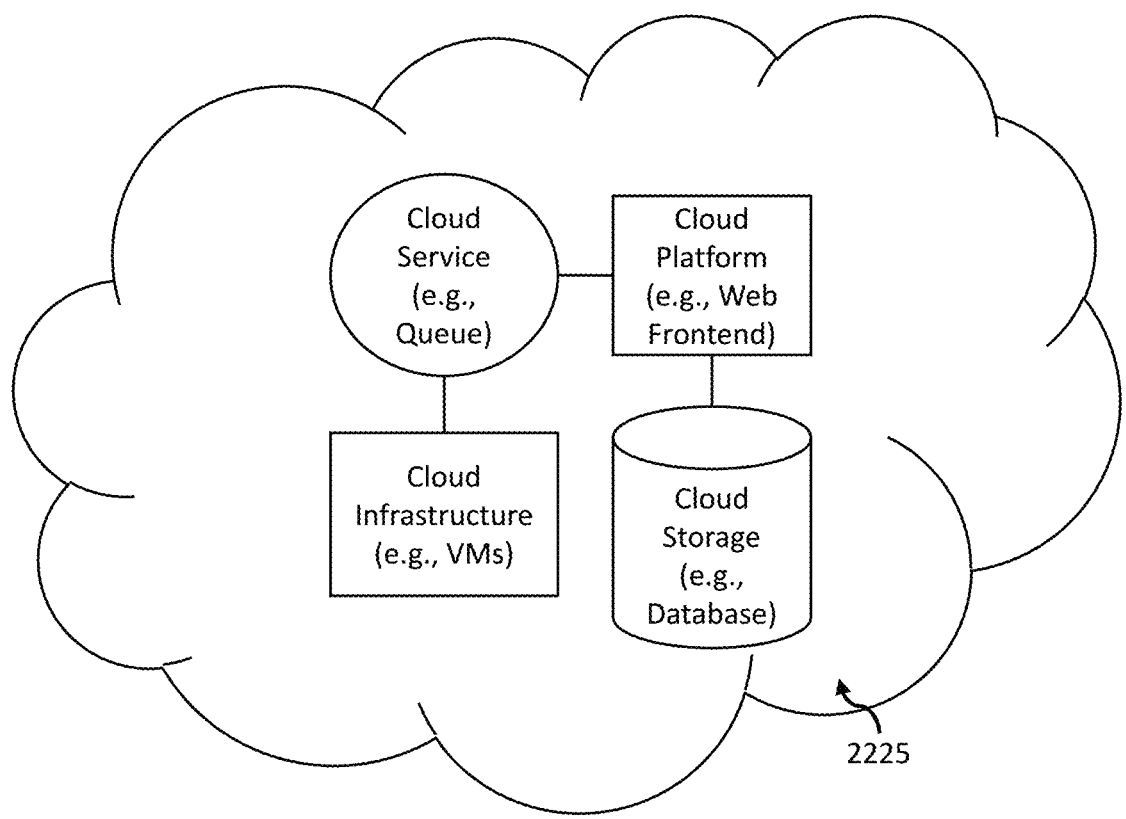
FIG. 23 depicts illustrative schematics of an exemplary implementation of the cloud computing/architecture(s) in which embodiments of an intelligent railway analytics platform may be specifically configured to operate in accordance with some embodiments of the present disclosure.
Figure 24:
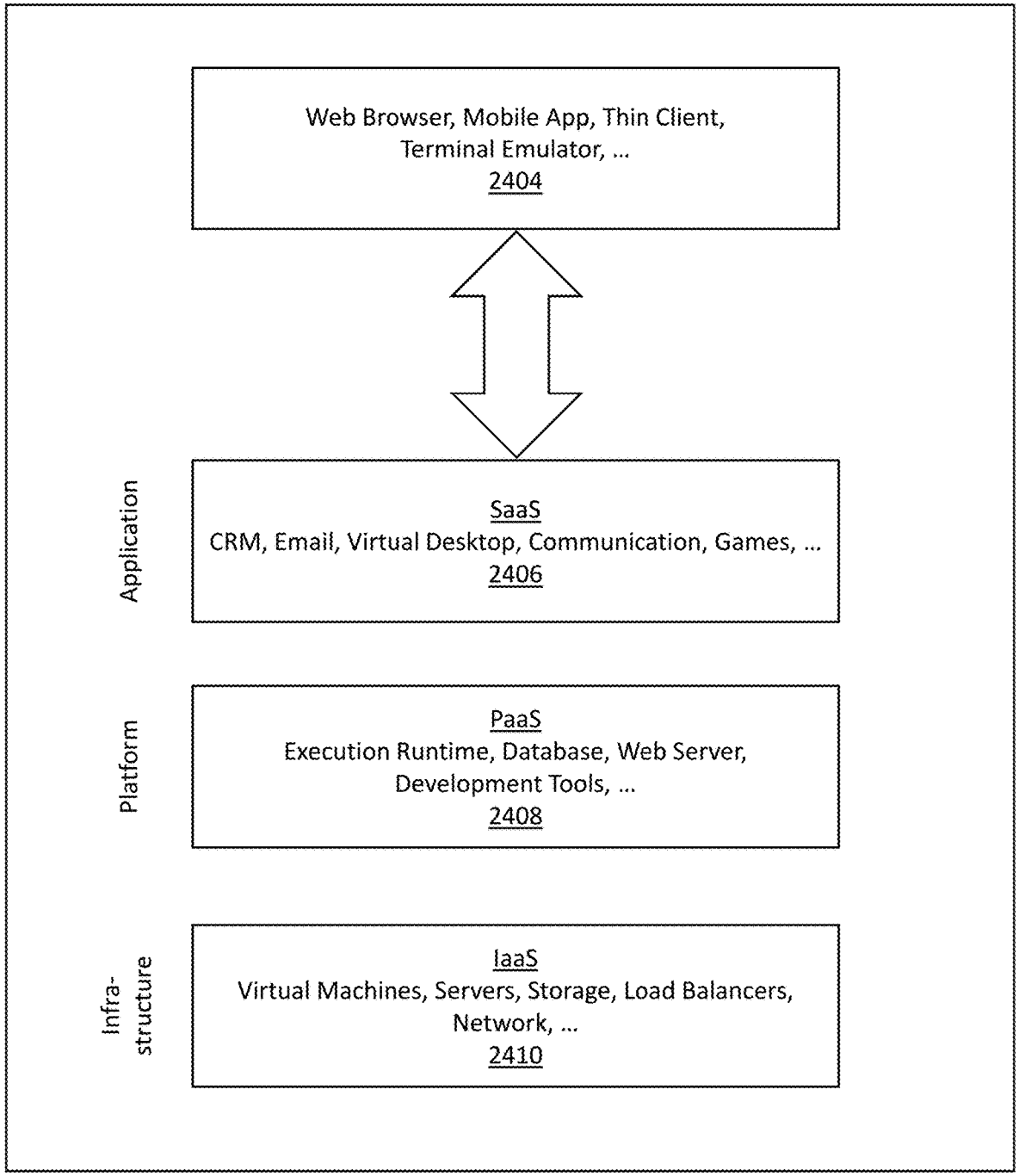
FIG. 24 depicts illustrative schematics of another exemplary implementation of the cloud computing/architecture(s) in which embodiments of an intelligent railway analytics platform may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 2225 such as, but not limiting to: infrastructure a service (IaaS) 2410, platform as a service (PaaS) 2408, and/or software as a service (SaaS) 2406 using a web browser, mobile app, thin client, terminal emulator or other endpoint 2404. FIGS. 23 and 24 illustrate schematics of exemplary implementations of the cloud computing/architecture(s) in which the exemplary systems of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure may now be described with reference to the following numbered clauses.

Clause 1. A method comprising:
receiving, by at least one processor, at least one railway image data feed from at least one imaging device;
wherein the at least one railway image data feed comprises a plurality of image frames of at least one railway location;
utilizing, by the at least one processor, at least one railway object recognition model to identify within at least one image frame of the plurality of image frames at least one object;
determining, by the at least one processor, at least one railway condition based at least in part on the at least one object;
determining, by the at least one processor, the at least one location and at least one time associated with the at least one railway condition based on at least one imaging device location associated with the at least one imaging device;
generating, by the at least one processor, railway metrics based at least in part on the at least one railway condition and at least one historical railway condition;
utilizing, by the at least one processor, a railway condition prediction model to predict at least one future railway condition affecting at least one of at least one operating condition or at least one operating demand based at least in part on the railway metrics;
determining, by the at least one processor, at least one operating recommendation to address that least one future railway condition; and
generating, by the at least one processor, at least one alert to at least one computing device associated with at least one user, wherein the at least one alert comprises an indication of at least one of the at least one railway condition or the at least one operating recommendation.

Clause 2. A system comprising:
at least one processor configured to execute instructions to perform steps to:
receive at least one railway image data feed from at least one imaging device;
wherein the at least one railway image data feed comprises a plurality of image frames of at least one railway location;
utilize at least one railway object recognition model to identify within at least one image frame of the plurality of image frames at least one object;
determine at least one railway condition based at least in part on the at least one object;
determine at least one location and at least one time associated with the at least one railway condition based on at least one imaging device location associated with the at least one imaging device;
generate railway metrics based at least in part on the at least one railway condition and at least one historical railway condition;
utilize a railway condition prediction model to predict at least one future railway condition affecting at least one of at least one operating condition or at least one operating demand based at least in part on the railway metrics;
determine at least one operating recommendation to address that least one future railway condition; and
generate at least one alert to at least one computing device associated with at least one user, wherein the at least one alert comprises an indication of at least one of the at least one railway condition and/or the at least one operating recommendation.

Clause 3. Systems and methods as recited in claims 1 and 2, further comprising:
receiving, by the at least one processor, the at least one railway image data feed comprising at least one forward-facing image data feed from the at least one imaging device positioned on at least one train;

wherein the at least one imaging device faces a direction of travel of the at least one train;

utilizing, by the at least one processor, the at least one railway object recognition model to identify within the at least one image frame of the plurality of image frames the at least one object and at least one track area;

wherein the at least one railway condition recognition model comprises a neural network trained on a training dataset of annotated images to automatically annotate images; and determining, by the at least one processor, at least one track area in the at least one image frame of the plurality of image frames based at least in part on at least one rail.

Clause 4. Systems and methods as recited in claim 3, further comprising:

determining, by the at least one processor, an obstruction railway condition based at least in part on the at least one object being within the at least one track area; and determining, by the at least one processor, a distance from the at least one train to the at least one object based at least in part on a two-frame motion estimation comprising:

mapping an optical flow to a relative distance from the at least one train to the at least one object; and converting the relative distance to an absolute distance based at least in part on a curve fit or alternative methods.

Clause 5. Systems and methods as recited in claim 4, further comprising determining, by the at least one processor, an obstruction railway condition location associated with the obstruction railway condition based at least in part on the at least one railway location and the distance from the at least one train.

Clause 6. Systems and methods as recited in claim 5, further comprising generating, by the at least one processor, at least one obstruction metric based at least in part on the obstruction railway condition location and the at least one object.

Clause 7. Systems and methods as recited in claim 4, further comprising generating, by the at least one processor, the at least one alert to at least one computing device associated with the at least one train to alert at least one train operator of the obstruction railway condition.

Clause 8. Systems and methods as recited in claim 4, wherein the at least one obstruction railway conditions comprises at least one of:

at least one obstacle/obstruction in the at least one track area, at least one person in the at least one track area, or at least one type of infrastructure defect in the at least on track area.

Clause 9. Systems and methods as recited in claim 3, further comprising:

utilizing, by the at least one processor based on the at least one object being a train platform, at least one inferencing algorithm to recognize each passenger on the train platform; and determining, by the at least one processor, a passenger count on the train platform indicative of an amount of passengers based at least in part on each passenger recognized on the train platform.

Clause 10 Systems and methods as recited in claim 9, further comprising generating, by the at least one processor, at least one passenger metric based at least in part on the passenger count, the train platform and the at least one railway location.

Clause 11. Systems and methods as recited in claim 3, further comprising:

determining, by the at least one processor, a defect railway condition based at least in part on the at least one object being a track defect on the at least one rail or in the at least one track area; and determining, by the at least one processor, a distance from the at least one train to the at least one object based at least in part on a two-frame motion estimation using a speed of the at least one train and change in at least one frame location of the at least one object between two consecutive image frames of the at least one image frame.

Clause 12. Systems and methods as recited in claim 11, further comprising determining, by the at least one processor, a defect railway condition location associated with the defect railway condition based at least in part on the at least one railway location and the distance from the at least one train.

Clause 13. Systems and methods as recited in claim 12, further comprising generating, by the at least one processor, at least one defect metric based at least in part on the defect railway condition location and the defect railway condition.

Clause 14. Systems and methods as recited in claim 11, wherein the defect railway condition comprises at least one of:

at least one infrastructure defect, at least one tunnel defect, at least one overhead/trackside device defect, or at least one railroad grade crossing defect.

Clause 15. Systems and methods as recited in claims 1 and 2, further comprising:

receiving, by the at least one processor, the at least one railway image data feed comprising at least one fixed location image data feed from the at least one imaging device positioned on in at least one fixed location facing at least one railway grade crossing;

utilizing, by the at least one processor, the at least one railway object recognition model to identify within the at least one image frame of the plurality of image frames the at least one object; and wherein the at least one railway condition recognition model comprises a first neural network trained on a first training dataset of annotated images to automatically annotate images to detect the at least one object;

utilizing, by the at least one processor, a second neural network trained on a second training dataset of annotated images to automatically annotate the plurality of images to detect at least one signal status or gate position; and wherein the at least one signal status comprises an off status or a flashing status or gate position.

Clause 16. Systems and methods as recited in claim 15, further comprising determining, by the at least one processor, an obstruction railway condition based at least in part on the at least one object being within the at least one grade crossing area.

Clause 17. Systems and methods as recited in claim 16, further comprising generating in response to the grade crossing blockage condition, by the at least one processor, at least one obstruction metric based at least in part on the at least one railway location and the at least one object; and wherein the at least one railway location comprises at least one geospatial location associated with the at least one fixed location.

Clause 18. Systems and methods as recited in claim 16, further comprising generating in response to the grade crossing blockage condition, by the at least one processor, at least one trespass metric based at least in part on the at least one railway location, the at least one signal light state being at least one red light state and the at least one object; and
  wherein the at least one railway location comprises at least one geospatial location associated with the at least one fixed location.

Clause 19. Systems and methods as recited in claim 15, wherein the at least one obstruction railway conditions comprises at least one of:
  at least one obstacle in the at least one grade crossing area,
  at least one person in the at least one grade crossing area, or
  at least one vehicle in the at least one grade crossing area.

Clause 20. Systems and methods as recited in claim 15, further comprising determining a grade crossing blockage time based at least in part on a time between changes of the at least one signal status.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
  receiving, by at least one processor, at least one railway image data feed from at least one imaging device;
    wherein the at least one railway image data feed comprises a plurality of image frames of at least one railway geographic location associated with at least one imaging device geographic location of the at least one imaging device during capture of each image frame of the plurality of image frames;
  utilizing, by the at least one processor, at least one railway object recognition model to identify within at least one image frame of the plurality of image frames at least one object;
  determining, by the at least one processor, at least one railway condition in the at least one railway geographic location based at least in part on the at least one object;
  determining, by the at least one processor, the at least one railway geographic location and at least one time associated with the at least one railway condition based on the at least one imaging device geographic location associated with the at least one imaging device;
  generating, by the at least one processor, railway metrics based at least in part on the at least one railway condition and at least one historical railway condition;
  utilizing, by the at least one processor, a railway condition prediction model to predict at least one future railway condition affecting at least one of at least one operating condition or at least one operating demand based at least in part on the railway metrics;
    wherein the at least one future railway condition is associated with at least one future time in the future relative to the at least one time;
    wherein the at least one future time is associated with at least one train being at the at least one railway geographic location;
  determining, by the at least one processor, at least one operating recommendation to address that least one future railway condition; and
  generating, by the at least one processor, at least one alert to at least one computing device associated with at least one user, wherein the at least one alert comprises an indication of at least one of the at least one railway condition or the at least one operating recommendation to facilitate preventing delay of the at least one train.

2. The method as recited in claim 1, further comprising:
  receiving, by the at least one processor, the at least one railway image data feed comprising at least one forward-facing image feed, at least one (or rear-facing image feed, or both, from the at least one imaging device positioned on at least one train;
    wherein the at least one imaging device faces a direction of travel of the at least one train;
  utilizing, by the at least one processor, the at least one railway object recognition model to identify within the at least one image frame of the plurality of image frames the at least one object and at least one track area;
    wherein the at least one railway condition recognition model comprises a neural network trained on a training dataset of annotated images to automatically annotate images; and
  determining, by the at least one processor, at least one track area in the at least one image frame of the plurality of image frames based at least in part on at least one rail.

3. The method as recited in claim 2, further comprising:
  determining, by the at least one processor, an obstruction railway condition based at least in part on the at least one object being within the at least one track area; and
  determining, by the at least one processor, a distance from the at least one train to the at least one object based at least in part on a two-frame motion estimation comprising:
    mapping an optical flow to a relative distance from the at least one train to the at least one object; and
    converting the relative distance to an absolute distance based at least in part on a curve fit or alternative methods.

4. The method as recited in claim 3, further comprising determining, by the at least one processor, an obstruction railway condition location associated with the obstruction railway condition based at least in part on the at least one railway location and the distance from the at least one train.

5. The method as recited in claim 4, further comprising generating, by the at least one processor, at least one obstruction metric based at least in part on the obstruction railway condition location and the at least one object.

6. The method as recited in claim 3, further comprising generating, by the at least one processor, the at least one alert to at least one computing device associated with the at least one train to alert at least one train operator of the obstruction railway condition.

7. The method as recited in claim 3, wherein the at least one obstruction railway conditions comprises at least one of:
  at least one obstacle in the at least one track area,
  at least one person in the at least one track area, or
  at least on infrastructure defect in the at least on track area.

8. The method as recited in claim 2, further comprising:
  utilizing, by the at least one processor based on the at least one object being a train platform, at least one inferencing algorithm to recognize each passenger on the train platform; and determining, by the at least one processor, a passenger count on the train platform indicative of an amount of passengers based at least in part on each passenger recognized on the train platform.

9. The method as recited in claim 8, further comprising generating, by the at least one processor, at least one passenger metric based at least in part on the passenger count, the train platform and the at least one railway location.

10. The method as recited in claim 2, further comprising:
determining, by the at least one processor, a defect railway condition based at least in part on the at least one object being a track defect on the at least one rail or in the at least one track area; and
determining, by the at least one processor, a distance from the at least one train to the at least one object based at least in part on a two-frame motion estimation using a speed of the at least one train and change in at least one frame location of the at least one object between two consecutive image frames of the at least one image frame.

11. The method as recited in claim 10, further comprising determining, by the at least one processor, a defect railway condition location associated with the defect railway condition based at least in part on the at least one railway location and the distance from the at least one train.

12. The method as recited in claim 11, further comprising generating, by the at least one processor, at least one defect metric based at least in part on the defect railway condition location and the defect railway condition.

13. The method as recited in claim 10, wherein the defect railway condition comprises at least one of:
at least one infrastructure defect,
at least one tunnel defect,
at least one railroad grade crossing defect, or
at least one overhead/trackside device defect.

14. The method as recited in claim 1, further comprising:
receiving, by the at least one processor, the at least one railway image data feed comprising at least one fixed location image data feed from the at least one imaging device positioned on in at least one fixed location facing at least one railway grade crossing;
utilizing, by the at least one processor, the at least one railway object recognition model to identify within the at least one image frame of the plurality of image frames the at least one object; and
wherein the at least one railway condition recognition model comprises a first neural network trained on a first training dataset of annotated images to automatically annotate images to detect the at least one object;
utilizing, by the at least one processor, a second neural network trained on a second training dataset of annotated images to automatically annotate the plurality of images to detect at least one signal status or gate position; and
wherein the at least one signal status comprises an off status or a flashing status.

15. The method as recited in claim 14, further comprising determining, by the at least one processor, an obstruction railway condition based at least in part on the at least one object being within the at least one railway grade crossing.

16. The method as recited in claim 15, further comprising generating in response to the obstruction railway condition, by the at least one processor, at least one obstruction metric based at least in part on the at least one railway location and the at least one object; and
wherein the at least one railway location comprises at least one geospatial location associated with the at least one fixed location.

17. The method as recited in claim 15, further comprising generating in response to the obstruction railway condition, by the at least one processor, at least one trespass metric based at least in part on the at least one railway location, the at least one signal light state being at least one red light state and the at least one object; and
wherein the at least one railway location comprises at least one geospatial location associated with the at least one fixed location.

18. The method as recited in claim 15, wherein the at least one obstruction railway conditions comprises at least one of:
at least one obstacle in the at least one railway grade crossing,
at least one person in the at least one railway grade crossing, or
at least one vehicle in the at least one railway grade crossing.

19. The method as recited in claim 14, further comprising determining, by the at least one processor, a grade crossing blockage time based at least in part on a time between changes of the at least one signal status.

20. A system comprising:
at least one processor configured to execute instructions to perform steps to:
receive at least one railway image data feed from at least one imaging device;
wherein the at least one railway image data feed comprises a plurality of image frames of at least one railway geographic location associated with at least one imaging device geographic location of the at least one imaging device during capture of each image frame of the plurality of image frames;
utilize at least one railway object recognition model to identify within at least one image frame of the plurality of image frames at least one object;
determine at least one railway condition in the at least one railway geographic location based at least in part on the at least one object;
determine the at least one railway geographic location and at least one time associated with the at least one railway condition based on the at least one imaging device geographic location associated with the at least one imaging device;
generate railway metrics based at least in part on the at least one railway condition and at least one historical railway condition;
utilize a railway condition prediction model to predict at least one future railway condition affecting at least one of at least one operating condition or at least one operating demand based at least in part on the railway metrics;
wherein the at least one future railway condition is associated with at least one future time in the future relative to the at least one time;
wherein the at least one future time is associated with at least one train being at the at least one railway geographic location;
determine at least one operating recommendation to address that least one future railway condition; and
generate at least one alert to at least one computing device associated with at least one user, wherein the at least one alert comprises an indication of at least one of the at least one railway condition or the at least one operating recommendation to facilitate preventing delay of the at least one train.

21. The system as recited in claim 20, wherein the at least one processor is further configured to execute instructions to perform steps to:
receive at least one railway image data feed comprising at least one forward-facing image or rear-facing image data feed from the at least one imaging device positioned on at least one train;
wherein the at least one imaging device faces a direction of travel of the at least one train;
utilize at least one railway object recognition model to identify within the at least one image frame of the plurality of image frames the at least one object and at least one track area;
wherein the at least one railway condition recognition model comprises a neural network trained on a training dataset of annotated images to automatically annotate images; and
determine at least one track area in the at least one image frame of the plurality of image frames based at least in part on at least one rail.

22. The system as recited in claim 21, wherein the at least one processor is further configured to execute instructions to perform steps to:
determine an obstruction railway condition based at least in part on the at least one object being within the at least one track area; and
determine a distance from the at least one train to the at least one object based at least in part on a two-frame motion estimation using a speed of the at least one train and change in at least one frame location of the at least one object between two consecutive image frames of the at least one image frame.

23. The system as recited in claim 22, wherein the at least one processor is further configured to execute instructions to perform steps to determine an obstruction railway condition location associated with the obstruction railway condition based at least in part on the at least one railway location and the distance from the at least one train.

24. The system as recited in claim 23, wherein the at least one processor is further configured to execute instructions to perform steps to generate at least one obstruction metric based at least in part on the obstruction railway condition location and the at least one object.

25. The system as recited in claim 23, wherein the at least one processor is further configured to execute instructions to perform steps to generate the at least one alert to at least one computing device associated with the at least one train to alert at least one train operator of the obstruction railway condition.

26. The system as recited in claim 23, wherein the at least one obstruction railway conditions comprises at least one of:
at least one obstacle in the at least one track area,
at least one person in the at least one track area, or
at least on infrastructure defect in the at least on track area.

27. The system as recited in claim 21, wherein the at least one processor is further configured to execute instructions to perform steps to:
utilize, based on the at least one object being a train platform, at least one inferencing algorithm to recognize each passenger on the train platform; and
determine a passenger count on the train platform indicative of an amount of passengers based at least in part on each passenger recognized on the train platform.

28. The system as recited in claim 27, wherein the at least one processor is further configured to execute instructions to perform steps to generate at least one passenger metric based at least in part on the passenger count, the train platform and the at least one railway location.

29. The system as recited in claim 21, wherein the at least one processor is further configured to execute instructions to perform steps to:
determine a defect railway condition based at least in part on the at least one object being a track defect on the at least one track area; and
determine a distance from the at least one train to the at least one object based at least in part on a two-frame motion estimation comprising:
mapping an optical flow to a relative distance from the at least one train to the at least one object; and
converting the relative distance to an absolute distance based at least in part on a curve fit or alternative methods.

30. The system as recited in claim 29, wherein the at least one processor is further configured to execute instructions to perform steps to determine a defect railway condition location associated with the defect railway condition based at least in part on the at least one railway location and the distance from the at least one train.

31. The system as recited in claim 30, wherein the at least one processor is further configured to execute instructions to perform steps to generate at least one defect metric based at least in part on the defect railway condition location and the defect railway condition.

32. The system as recited in claim 31, wherein the defect railway condition comprises at least one of:
at least one infrastructure defect,
at least one tunnel defect,
at least one railroad grade crossing defect, or
at least one overhead/trackside device defect.

33. The system as recited in claim 20, wherein the at least one processor is further configured to execute instructions to perform steps to:
receive the at least one railway image data feed comprising at least one fixed location image data feed from the at least one imaging device positioned on in at least one fixed location facing at least one railway grade crossing;
utilize the at least one railway object recognition model to identify within the at least one image frame of the plurality of image frames the at least one object; and
wherein the at least one railway condition recognition model comprises a first neural network trained on a first training dataset of annotated images to automatically annotate images to detect the at least one object;
utilize a second neural network trained on a second training dataset of annotated images to automatically annotate the plurality of images to detect at least one signal light state; and
wherein the at least one signal light state status comprises an off status or a flashing status.

34. The system as recited in claim 33, wherein the at least one processor is further configured to execute instructions to perform steps to determine an obstruction railway condition based at least in part on the at least one object being within the at least one railway grade crossing.

35. The system as recited in claim 34, wherein the at least one processor is further configured to execute instructions to perform steps to generate in response to the obstruction railway condition, by the at least one processor, at least one obstruction metric based at least in part on the at least one railway location and the at least one object; and
    wherein the at least one railway location comprises at least one geospatial location associated with the at least one fixed location.

36. The system as recited in claim 35, wherein the at least one processor is further configured to execute instructions to perform steps to generate in response to the obstruction railway condition, by the at least one processor, at least one trespass metric based at least in part on the at least one railway location, the at least one signal light state being at least one red light state and the at least one object; and
    wherein the at least one railway location comprises at least one geospatial location associated with the at least one fixed location.

37. The system as recited in claim 36, wherein the at least one obstruction railway condition comprises at least one of:
    at least one obstacle in the at least one railway grade crossing,
    at least one person in the at least one railway grade crossing, or
    at least one vehicle in the at least one railway grade crossing.

38. The system as recited in claim 33, wherein the at least one processor is further configured to execute instructions to perform steps to determine a grade crossing blockage time based at least in part on a time between changes of the at least one signal status.

\* \* \* \* \*